(12) United States Patent
Nakazawa

(10) Patent No.: US 6,431,297 B1
(45) Date of Patent: Aug. 13, 2002

(54) APPARATUS FOR DRIVING ELECTRIC CAR BY INVERTER-CONTROLLED MOTOR THROUGH GEAR MECHANISM

(75) Inventor: Yosuke Nakazawa, Fuchu (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/504,104

(22) Filed: Feb. 14, 2000

(30) Foreign Application Priority Data

Feb. 18, 1999 (JP) .......................................... 11-040620

(51) Int. Cl.⁷ ................................................. B60K 1/02
(52) U.S. Cl. ..................... 180/65.6; 180/65.1; 180/65.8
(58) Field of Search .............................. 180/65.1, 65.3, 180/65.4, 65.5, 65.6, 65.8

(56) References Cited

U.S. PATENT DOCUMENTS

| | | | | |
|---|---|---|---|---|
| 1,172,456 A | * | 2/1916 | Hoadley | 180/65.4 |
| 3,477,536 A | * | 11/1969 | Carini | 180/65.4 |
| 3,799,284 A | * | 3/1974 | Hender | 180/65.2 |
| 3,908,776 A | * | 9/1975 | Dudley | 180/65.5 |
| 4,213,270 A | * | 7/1980 | Oda | 446/456 |
| 4,290,559 A | * | 9/1981 | Mayer | 239/737 |
| 4,453,111 A | * | 6/1984 | Acker | 318/111 |
| 4,554,989 A | * | 11/1985 | Gruich et al. | 180/65.4 |
| 5,331,239 A | * | 7/1994 | Kwun et al. | 310/68 R |
| 5,517,401 A | * | 5/1996 | Kinoshita et al. | 363/98 |
| 5,537,011 A | * | 7/1996 | Bachman et al. | 318/99 |
| 5,549,172 A | * | 8/1996 | Mutoh et al. | 180/65.1 |
| 5,627,438 A | * | 5/1997 | Barrett | 318/139 |
| 5,757,150 A | * | 5/1998 | Kinoshita et al. | 318/139 |
| 6,107,776 A | * | 8/2000 | Nakazawa | 318/811 |
| 6,254,032 B1 | * | 7/2001 | Bucher | 244/12.2 |
| 6,293,491 B1 | * | 9/2001 | Wobben | 244/17.23 |

FOREIGN PATENT DOCUMENTS

| | | | |
|---|---|---|---|
| GB | 2115995 | * | 9/1983 |
| JP | 60141103 | * | 7/1985 |
| JP | 63167678 | * | 7/1988 |
| JP | 04143123 | * | 5/1992 |

\* cited by examiner

Primary Examiner—Brian L. Johnson
Assistant Examiner—J. Allen Shriver
(74) Attorney, Agent, or Firm—Foley & Lardner

(57) ABSTRACT

An apparatus for driving and controlling a car has a large gear directly connected to a wheel shaft of the car, small gears meshing with the large gear, AC motors connected to the small gears, respectively, and inverters whose AC output sides are connected to the AC motors, respectively, and whose DC input sides are connected in series in multiple stages to a high-voltage DC power source. Torque for driving the large gear connected to the wheel shaft is divided and borne by the small gears, so that each small gear receives small torque. This enables each tooth of each gear to have small mechanical strength. As a result, the cross-sectional area of each tooth of each small gear can be reduced to increase the number of teeth of the large gear that meshes with the small gears, to increase a gear ratio defined by the large and small gears. The DC input terminals of the inverters are connected in series to the high-voltage DC power source, and a DC input voltage for each inverter is reduced to a standard inverter level. Consequently, the inverters of the apparatus may be mass-produced standard inverters.

9 Claims, 22 Drawing Sheets

FIG.17A
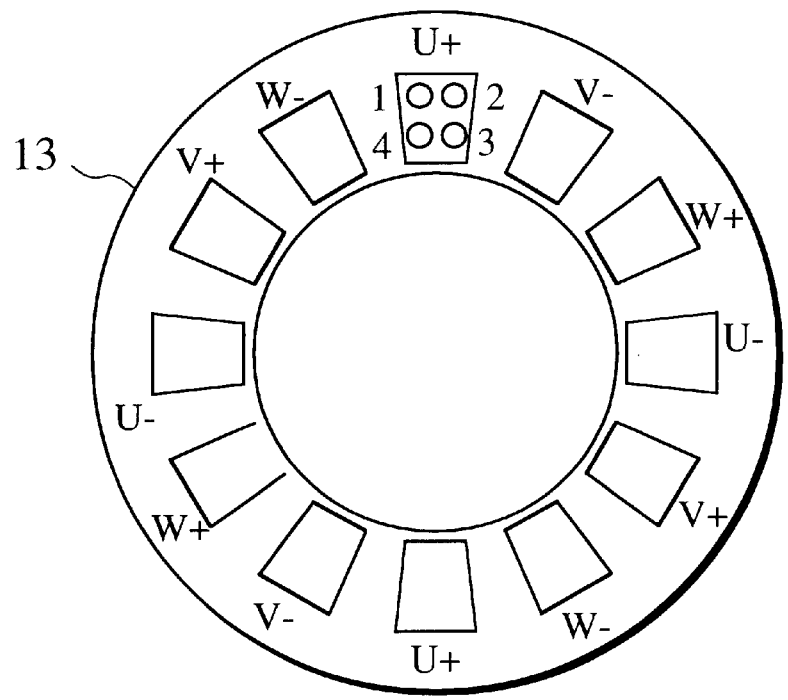
SECTIONAL VIEW OF STATOR
FIG.17B
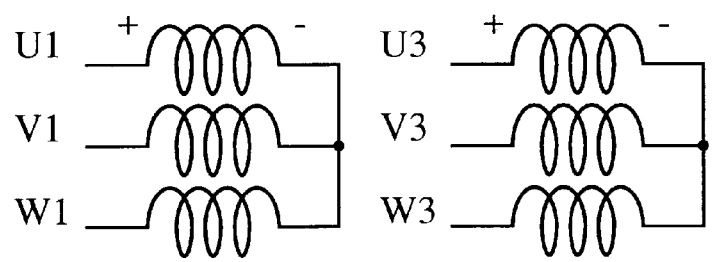
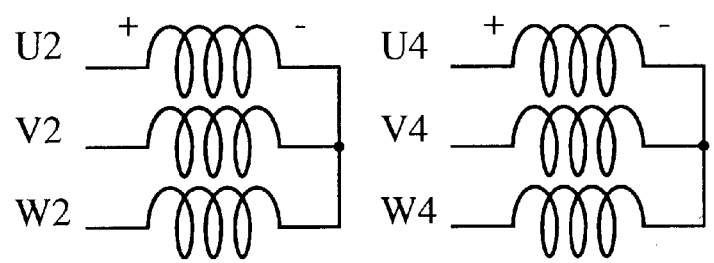

APPARATUS FOR DRIVING ELECTRIC CAR BY INVERTER-CONTROLLED MOTOR THROUGH GEAR MECHANISM

BACKGROUND OF THE INVENTION

1. Field of the Invention

The present invention relates to an apparatus for driving an electric car by inverter-controlled motors through a gear mechanism.

2. Description of the Prior Art

FIGS. 1A, 1B, and 2 show an apparatus for driving a car according to a prior art. The apparatus has a large gear 11, a small gear 12, an AC motor 13, an inverter 14, a filter reactor 15, and a feeder system 16. The large gear 11 is coaxial to and directly connected to a wheel shaft 10 and is mechanically arranged to mesh with the small gear 12. The AC motor 13 generates torque, which is amplified at an amplification factor defined by a gear ratio of the small gear 12 and large gear 11, thereby providing acceleration and deceleration force to drive the car. Also shown are a truck 9 and a smoothing capacitor 8.

The problems of the prior art will be explained. To transmit large torque, each tooth of each gear must have a size (an area) larger than a predetermined value. Mechanical strength and a limited underfloor space restrict the maximum numbers of teeth of gears to restrict a maximum gear ratio. This puts limits on a torque amplification factor of gears and the speed of a motor. Namely, the prior art restricts the speed of the motor of the car driving apparatus, and therefore, is impossible to reduce the size, weight, and cost of the apparatus by using the merit of operating the motor at high speed.

Inverters used to supply electricity to motors for driving a car usually operate on an input DC voltage of about 1500 V. This voltage is extremely high compared with an input DC voltage of about 280 V for standard inverters. As a result, the inverters for cars cause a serious harmonic induction problem. In addition, the inverters for cars are designed according to special specifications, and therefore, involve high costs.

SUMMARY OF THE INVENTION

A first object of the present invention is to provide an apparatus for driving and controlling a car, capable of increasing a gear ratio defined by small gears driven by AC motors and a large gear directly connected to a wheel shaft. The apparatus is small, light, and low-cost because it can operate the AC motors at high speed. The first object of the present invention is achieved by directly connecting a large gear to a wheel shaft, meshing the large gear with small gears, connecting the small gears to AC motors, and connecting the AC motors to AC sides of inverters, respectively. This arrangement distributes and reduces torque applied to the small gears, to decrease torque to be transmitted by each small gear. This enables the cross-sectional area of each tooth of each small gear to be reduced, thereby enabling a gear ratio defined by the gears to be increased.

A second object of the present invention is to provide an apparatus for driving a car, capable of reducing an input DC voltage for an inverter for driving an AC motor to a standard inverter level, minimizing the harmonic induction problem, and improving reliability by using low-cost, mass-produced standard inverters. The second object of the present invention is achieved by connecting small gears to AC motors, respectively, driving the AC motors by inverters, respectively, connecting the DC input sides of the inverters in series in multiple stages, and supplying power thereto from a high-voltage power source. This arrangement reduces an input DC voltage for each inverter to a standard inverter level.

More precisely, a first aspect of the present invention provides an apparatus for driving and controlling a car, having a large gear directly connected to a wheel shaft, small gears meshing with the large gear, AC motors connected to the small gears, respectively, and inverters connected to the AC motors, respectively, for supplying power thereto. The DC input sides of the inverters are connected in series. A positive terminal of one of the inverters arranged in the first stage and a negative terminal of one of the inverters arranged in the last stage are connected to a high-voltage DC power source.

This apparatus distributes torque to the small gears to drive the large gear that is directly connected to the wheel shaft. Each small gear bears small torque, and therefore, each tooth of each gear may have small mechanical strength. This means that the cross-sectional area of each tooth of each small gear may be reduced, the number of teeth of the large gear meshing with the small gears may be increased, a gear ratio defined by the small and large gears may be increased, and the size, weight, and cost of the apparatus may be reduced by operating the motors at high speed. DC input terminals of the inverters are connected in series to receive power from the high-voltage DC power source, while an input DC voltage to each inverter is dropped to a standard inverter level. This minimizes the harmonic induction problem. Since the apparatus may employ mass-produced standard inverters as they are, it is producible at low cost and high reliability.

Each of the inverters may have an inverter controller that receives a DC source voltage value detected on a power-source feeder line and an input voltage value detected at the inverter, finds a difference between the input voltage value and a quotient obtained by dividing the DC source voltage value by the number of the series-connected inverters, and corrects an output torque command for the inverter according to the difference. This arrangement suppresses a DC voltage imbalance caused by the individual differences of the series-connected inverters and prevents an input overvoltage to the inverters due to the DC voltage imbalance that may stop the apparatus.

Each of the inverters may have a short-circuit switch between the positive and negative DC input terminals thereof, to short-circuit the inverter if the inverter fails, so that the remaining inverters may continue to operate. Even if some inverters fail, this arrangement minimizes torque reduction and continues the operation of the car.

The apparatus may have a breaker for breaking the DC power to the DC input sides of the inverters, if at least one of the inverters fails so that the car must be operated with the remaining inverters, and at the same time, if the value of a DC source voltage exceeds the sum of allowable input DC voltage values of the remaining inverters. If some inverters fail so that the car must be operated with the remaining inverters, and at the same time, if a DC input overvoltage that is above the withstand voltage values of the remaining inverters is applied to the remaining inverters, the breaker opens to prevent the breakdown of the remaining inverters.

The apparatus may have an inverter controller for preparing an inverter output voltage command according to a composite value of output currents of the inverters so that the inverters may provide pulse patterns according to the same voltage command. This arrangement automatically equalizes DC voltage and continues the powering operation of the car without a special balance control of DC voltage.

A frame of each AC motor may electrically be short-circuited with a power source ground. The apparatus may have an inverter controller for providing a phase difference for a triangular wave that is used to form a PWM pulse pattern of each inverter. This arrangement minimizes a high-frequency leakage current to the ground due to the PWM switching of the inverters and maintains the quality of signals and communication.

The apparatus may have an inverter controller for each of the inverters, for calculating an output effective power value according to an input DC voltage value and an input DC current value both detected at the inverter, calculating an effective power command value according to a motor angular frequency and a torque command value related to the inverter, calculating a difference between the output effective power value and the effective power command value, and correcting the torque command value according to the difference. This arrangement suppresses an output torque imbalance, which finally causes a DC voltage imbalance, due to the individual differences of permanent-magnet flux of the motors and prevents the stoppage of the operation of the apparatus due to an inverter input over-voltage caused by the DC voltage imbalance.

A second aspect of the present invention provides an apparatus for driving and controlling a car, having a large gear provided for each of at least two wheel shafts of the car, the large gear being directly connected to the wheel shaft, small gears meshing with the large gear, AC motors connected to the small gears, respectively, inverters connected to the AC motors, respectively, to supply power thereto, DC input terminals of the inverters that drive the AC motors that are connected to the different wheel shafts are connected in series in multiple stages to a DC power source, and a breaker for breaking the DC power to all of the inverters.

If some inverters fail, and at the same time, if the driving force of the car must be maintained by increasing the current and torque of the sound inverters and motors, the apparatus of the second aspect transmits torque to rails through the two wheel shafts. This reduces the risk of wheels idling on the rails and secures acceleration for the car.

A third aspect of the present invention provides an apparatus for driving and controlling a car, having a large gear directly connected to a wheel shaft, a small gear meshing with the large gear, a 3-by-n-phase AC motor (n is an integer equal to or larger than 2) connected to the small gear, and n inverters for supplying power to the AC motor. DC input sides of the inverters are connected in series in n stages to a DC power source.

DC input terminals of the inverters are connected in series to receive power from a high-voltage feeder line. This arrangement reduces a DC input voltage to the inverters to a standard inverter level and minimizes the harmonic induction problem. This arrangement employs mass-produced standard inverters as they are to reduce costs and improve reliability.

Each of the n inverters may have an inverter controller that receives a DC source voltage value detected at the DC power source and an input voltage value detected at the inverter, finds a difference between the input voltage value and a quotient obtained by dividing the DC source voltage value by n, and corrects an output torque command according to the difference. This arrangement suppresses a DC voltage imbalance caused by the individual differences of the series-connected inverters and prevents an input over-voltage to the inverters due to the DC voltage imbalance that may stop the apparatus.

Each of the n inverters may have a short-circuit switch between the positive and negative DC input terminals thereof, to short-circuit the inverter if the inverter has trouble, so that the remaining inverters may continue to operate. Even if some inverters fail, this arrangement minimizes torque reduction and continues the operation of the car.

The AC motor may be a permanent-magnet synchronous motor, and the apparatus may have an inverter controller. If at least one of the inverters fails, the inverter controller controls the remaining sound inverters to pass a current in a direction to cancel permanent-magnet flux of the motor. The permanent-magnet synchronous motor has a high inductive voltage to improve efficiency and reduce the size of the apparatus.

A fourth aspect of the present invention provides an apparatus for driving and controlling a car, having a large gear directly connected to a wheel shaft, small gears meshing with the large gear, AC motors connected to the small gears, respectively, inverters connected to the AC motors, respectively, for supplying power thereto, converters connected to the DC input sides of the inverters, respectively, having AC input terminals connected in series in multiple stages, and a transformer for receiving power from an AC power source and providing a proper rated AC voltage to the converters.

According to the fourth aspect, the AC input terminals of the inverters are connected in series through the converters, to receive power from a high-voltage feeder line, so that a DC input voltage to the inverters is dropped to a standard inverter level. This minimizes the harmonic induction problem. The inverters of the fourth aspect may be mass-produced standard inverters to reduce costs and improve reliability. The fourth aspect multiplexes the converters in series to apply multiple PWM voltage levels to a secondary winding of the transformer. This reduces harmonics escaping to the power source system, as well as heat loss and noise caused on the transformer due to the harmonics.

Each of the converters may have a short-circuit switch between the AC input terminals of the converter. The short circuit switch short-circuits the converter if the converter or the inverter connected to the DC output side of the converter fails, so that the remaining converters and inverters may continue to operate. Even if some of the inverters or converters fail, this arrangement minimizes a torque reduction and continues the operation of the car.

A fifth aspect of the present invention provides an apparatus for driving and controlling a car, having a large gear directly connected to a wheel shaft, small gears meshing with the large gear, AC motors connected to the small gears, respectively, inverters whose AC output sides are connected to the AC motors, respectively, to supply power thereto, the DC input sides of the inverters being connected in series, a transformer for receiving power from an AC power source and providing a proper rated AC voltage, a converter whose DC output side is connected to a positive terminal of one of the inverters arranged in the first stage and a negative terminal of one of the inverters arranged in the last stage and whose AC input side is connected to the secondary side of the transformer, and short-circuit switches connected to the inverters, respectively, each between the positive and negative input terminals of the corresponding inverter. Each of the short-circuit switch is closed if the corresponding inverter fails, so that the remaining inverters may continue to operate.

The fifth aspect connects the DC input terminals of the inverters in series to receive power from a high-voltage feeder line through the common converter. This decreases a DC input voltage to the inverters to a standard inverter level and minimizes the harmonic induction problem. The inverters of the fifth aspect may be mass-produced standard inverters to reduce costs and improve reliability. In addition, the fifth aspect arranges the short-circuit switch between the positive and negative DC input terminals of each inverter. Even if some inverters fail, this arrangement minimizes torque reduction and continuously operates the car.

The apparatus for driving and controlling a car according to any one of the first to fifth aspects of the present invention is capable of mechanically integrating an AC motor and an inverter into a unit and operating the AC motor at high speed to spare a space in a truck. This space is used to accommodate the motor-inverter unit. This eliminates wiring between the motor and the inverter. Further, this eliminates an underfloor space to be prepared according to the prior art for accommodating an inverter. This enables even a motor car to be constructed into a double-decker structure to accommodate more passenger seats.

BRIEF DESCRIPTION OF THE DRAWINGS

FIGS. 17A and 17B are sectional view and coil wiring diagram showing a 12-phase AC motor according to the ninth embodiment;

DETAILED DESCRIPTION OF THE EMBODIMENTS

Figure 1A:
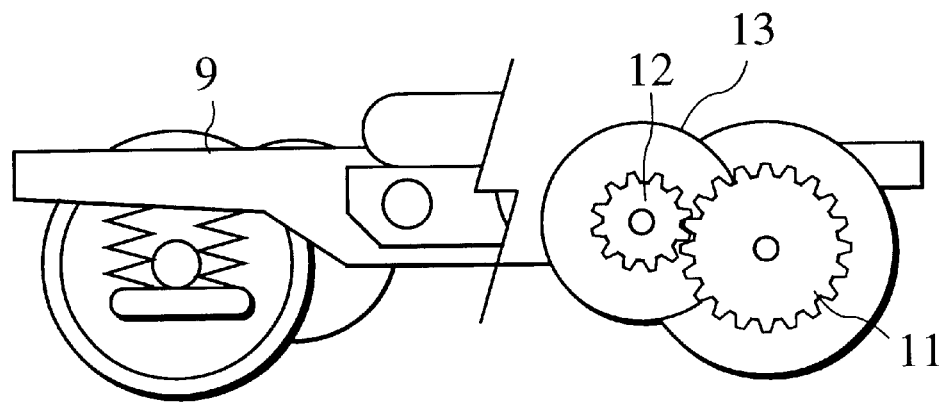
FIGS. 1A and 1B are front and plan views showing a structure according to a prior art.
Figure 1B:
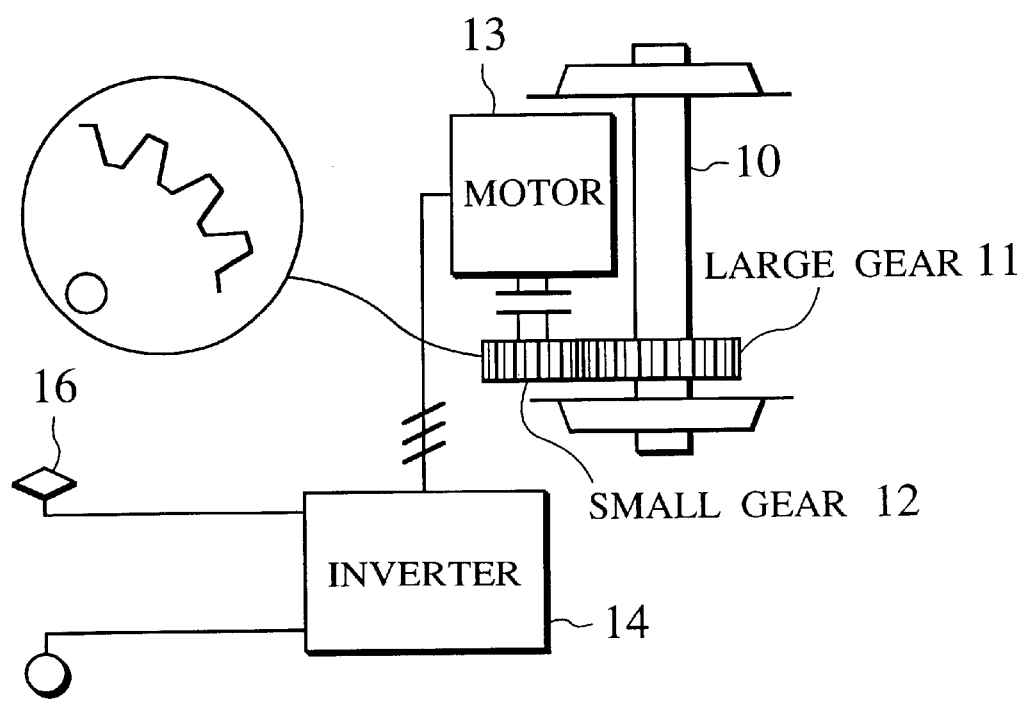
Figure 2:
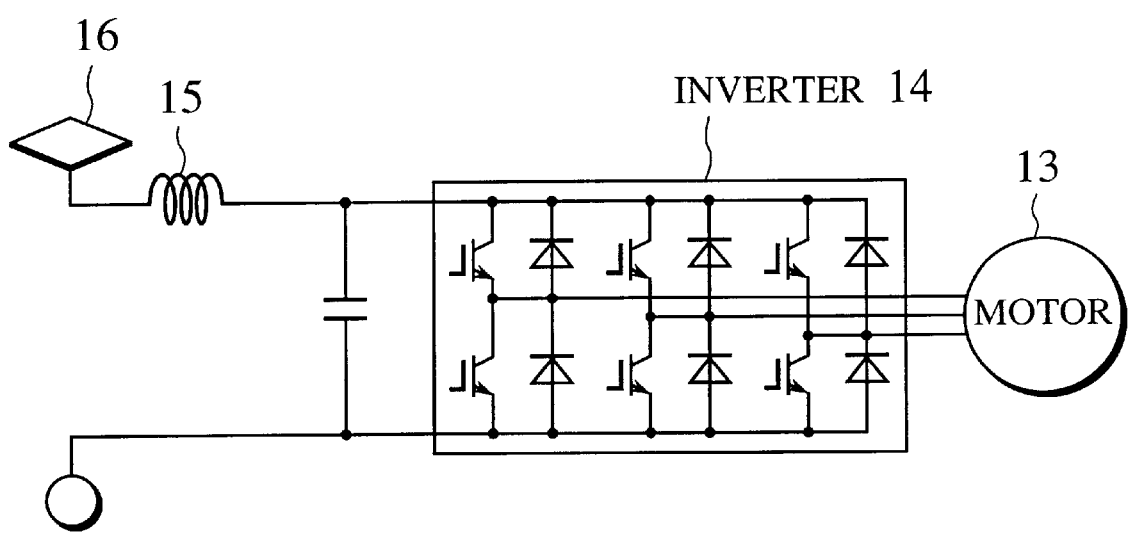
FIG. 2 is a block diagram showing a circuit according to a prior art.
Figure 3A:
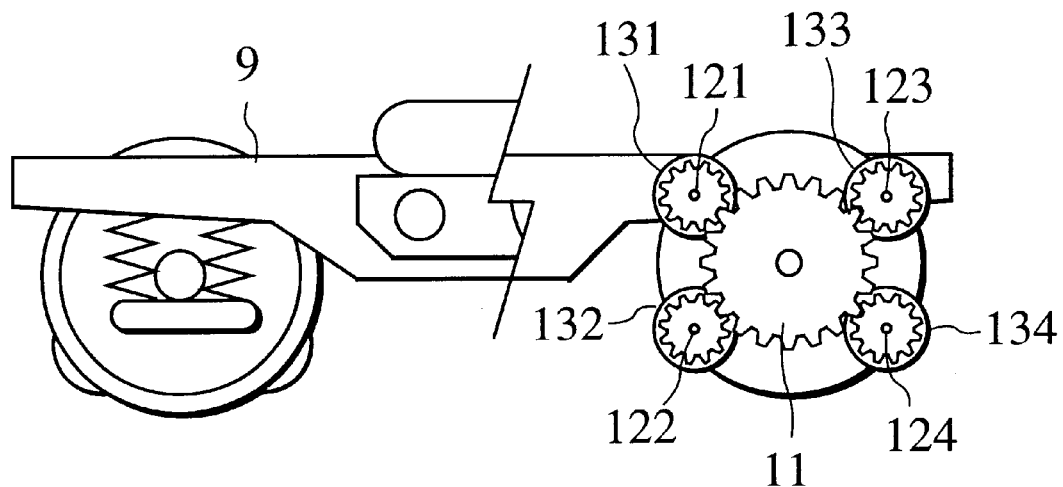
FIGS. 3A and 3B are front and plan views showing a structure according to a first embodiment of the present invention.
Figure 3B:
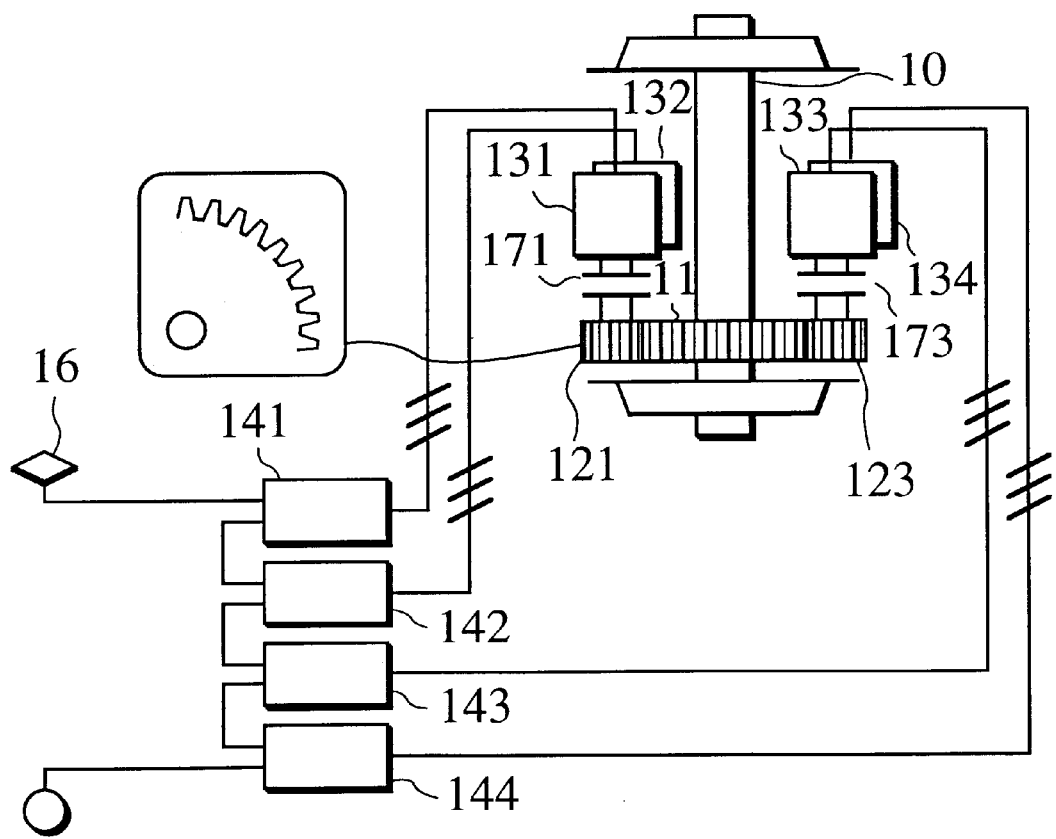
Figure 4:
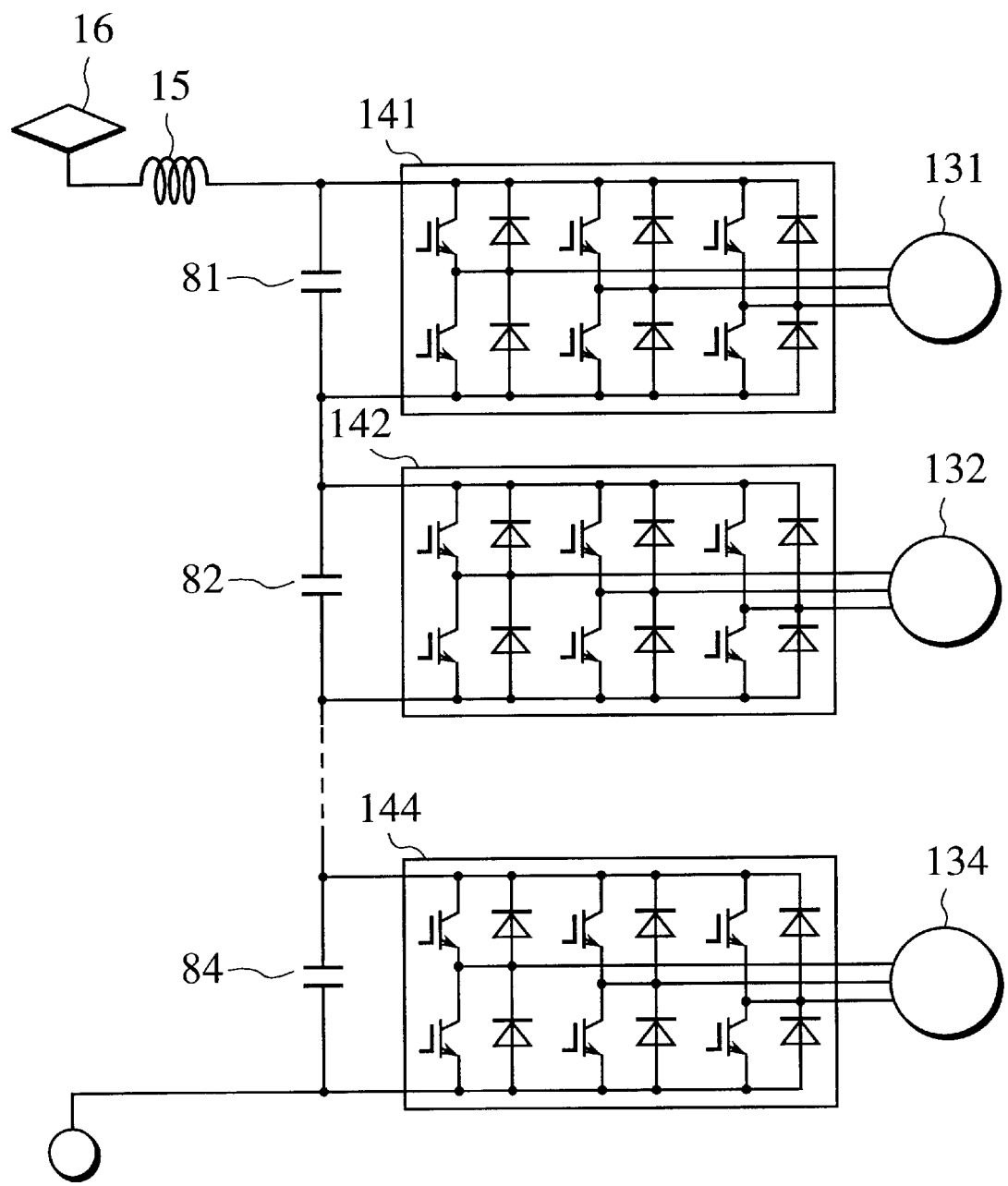
FIG. 4 is a block diagram showing a circuit according to the first embodiment.

Various embodiments of the present invention will be described with reference to the accompanying drawings. FIGS. 3A, 3B, and 4 show an apparatus for driving and controlling a car according to the first embodiment of the present invention. The apparatus includes a large gear 11, four small gears 121 to 124, four AC motors 131 to 134, four inverters 141 to 144, a filter reactor 15, a feeder system 16, and four flexible joints 171 to 174.

The large gear 11 is coaxial to and directly connected to a wheel shaft 10 and is mechanically arranged to mesh with the small gears 121 to 124. Torque generated by the AC motors 131 to 134 is amplified at a gear ratio defined by the small gears 121 to 124 and large gear 11, to rotate the wheel shaft 10 and drive the car.

Compared with the prior art that transmits torque to a wheel shaft and wheels with a small gear and a large gear, the first embodiment transmits the same torque to the wheel shaft by dividing the torque with the four small gears 121 to 124 to thereby reduce mechanical strength required for each tooth of each gear. As a result, the first embodiment enables each tooth to be smaller and the large gear to have more teeth to realize a higher gear ratio.

The small gears 121 to 124 are connected to rotor shafts of the AC motors 131 to 134 through the flexible joints 171 to 174, respectively. The flexible joints 171 to 174 transmit torque generated by the AC motors 131 to 134 to the small gears 121 to 124 even if the axial centers of the AC motors 131 to 134 installed on a truck 9 deviate from the axial centers of the small gears 121 to 124 installed on the wheel shaft 10 due to a spring mechanism of the truck 9.

The AC motors 131 to 134 are each a 3-phase AC motor that receives 3-phase power from a corresponding one of the inverters 141 to 144. The AC motors 131 to 134 may each be a permanent-magnet synchronous motor, an induction motor, or a reluctance motor.

The inverters 141 to 144 may each be a standard 3-phase PWM (pulse width modulation) inverter that employs the switching operation of power semiconductor elements such as IGBTs (insulated gate bipolar transistors) to provide a required 3-phase AC voltage from a constant-voltage direct current. Smoothing capacitors 81 to 84 are connected between positive and negative DC input terminals of the inverters 141 to 144, respectively and are connected in series in four stages.

The feeder system 16 is a pantograph that mechanically and electrically contacts with a feeder line to receive DC power therefrom. The feeder system 16 is electrically connected to a positive DC input terminal of the inverter 141 through the filter reactor 15.

The filter reactor 15 prevents harmonics caused by the PWM switching of the inverters from leaking to the feeder line and also reduces a short-circuit current when any one of the inverters causes a DC short-circuit failure.

A negative DC input terminal of the inverter 144 is connected with wheels and rails to ground.

In the apparatus of the first embodiment, the feeder system 16 supplies a DC source voltage through the filter reactor 15. The DC source voltage is divided by four, and the divided voltages are supplied to the series-connected inverters 141 to 144, respectively. The inverters provide 3-phase AC power of a required frequency to the AC motors 131 to 134 connected thereto. Torque generated by the AC motors 131 to 134 rotates the small gears 121 to 124 through the flexible joints 171 to 174, thereby rotating the large gear 11 meshing with the small gears 121 to 124, thus rotating the wheel shaft 10 directly connected to the large gear 11. The wheel shaft 10 drives wheels.

This arrangement distributes and reduces torque to be borne by each of the small gears 121 to 124. This enables the cross-sectional area of each tooth of each gear to be reduced, thereby enabling a gear ratio to be increased. Increasing a gear ratio leads to driving a motor at high speed. This results in reducing the size, weight, and cost of the apparatus.

The DC input sides of the inverters 141 to 144 are connected in series to receive high-voltage power from a feeder line through the feeder system 16. This arrangement reduces a DC input voltage to each inverter to a standard inverter level, thereby minimizing the harmonic induction problem. In addition, the apparatus may be made of mass-produced standard inverters to reduce the cost of the apparatus and improve the reliability thereof.

Figure 5:
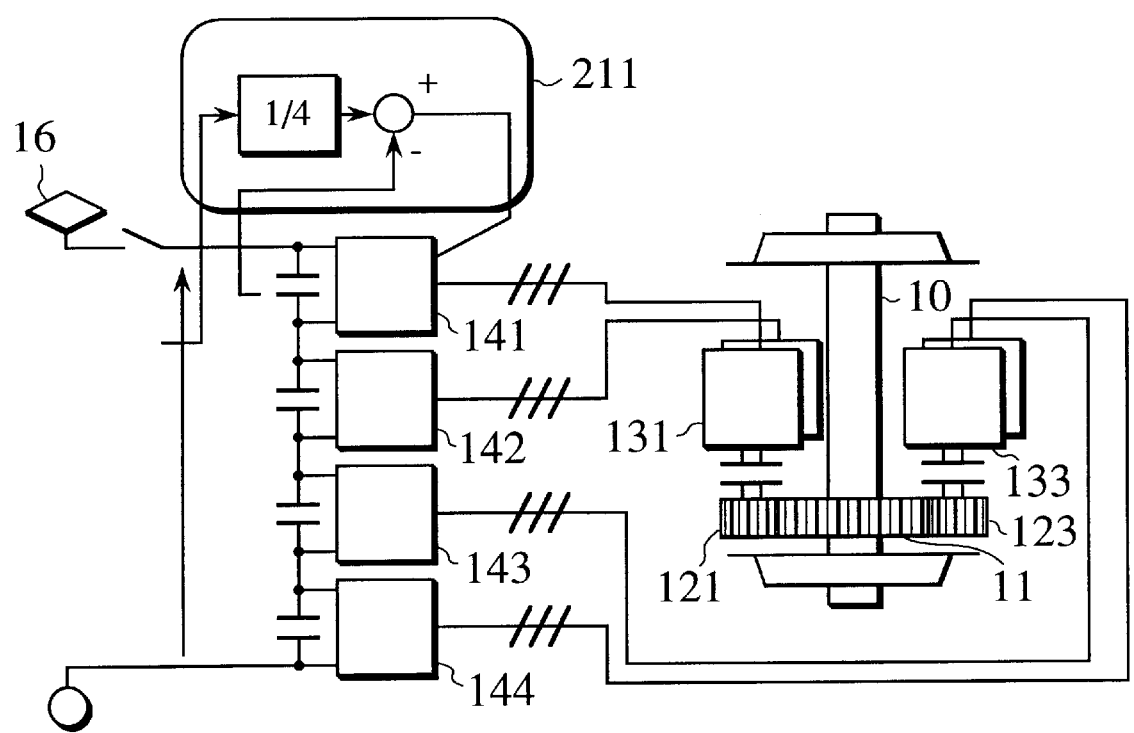
FIG. 5 is a plan view showing a structure according to a second embodiment of the present invention.
Figure 6:
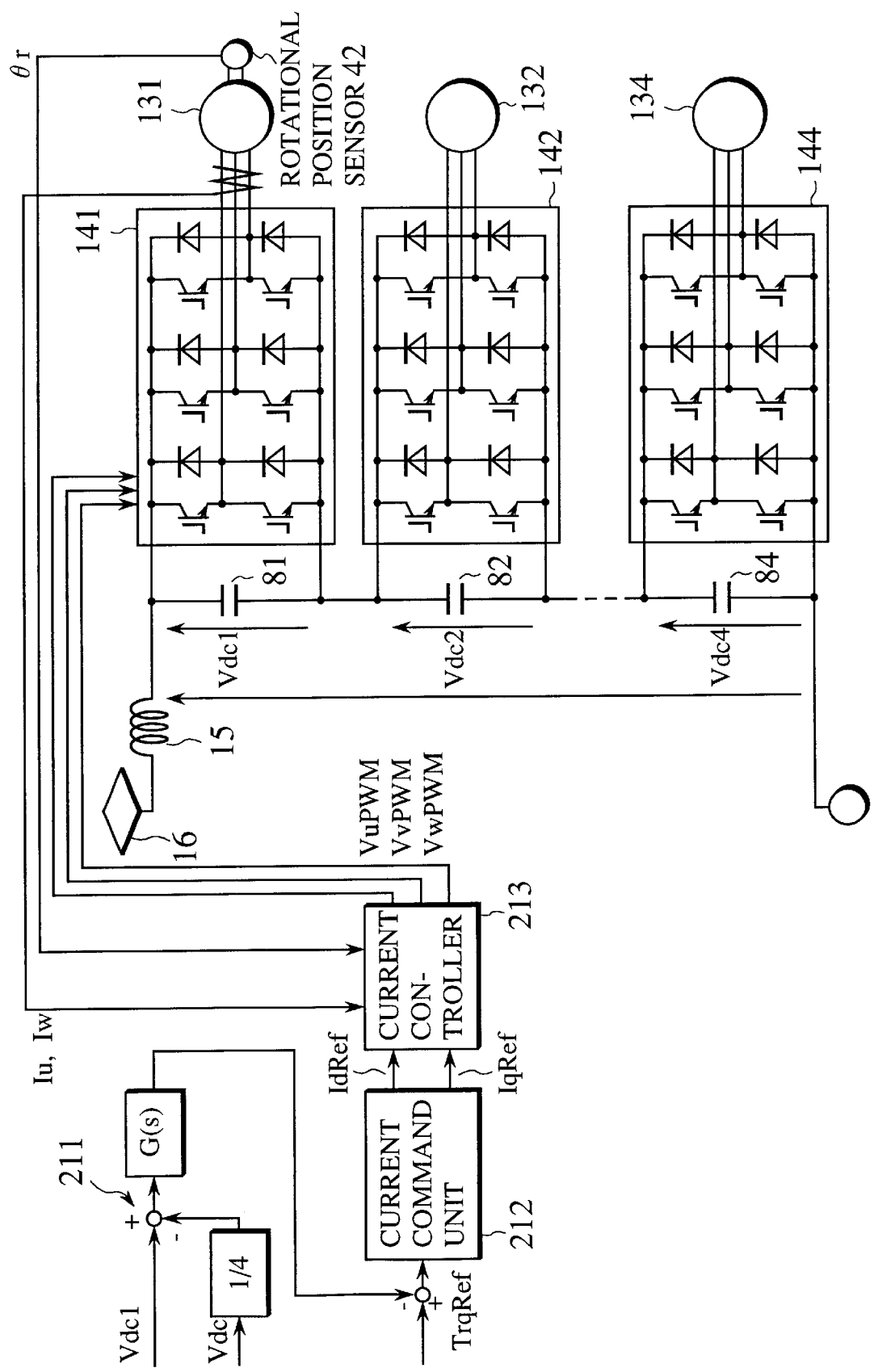
FIG. 6 is a block diagram showing a circuit according to the second embodiment.

FIGS. 5 and 6 show an apparatus for driving and controlling a car according to the second embodiment of the present invention. The same parts as those of the first embodiment of FIGS. 3 and 4 are represented with like reference numerals in FIGS. 5 and 6. Parts specific to the second embodiment will be explained.

An inverter 141 is provided with a controller 211. The controller 211 receives a DC input voltage Vdc1 for the inverter 141, a DC full voltage Vdc, a torque command TrqRef from a motorman cab, a U-phase output current feedback value Iu, a W-phase output current feedback value Iw, and a motor rotational position feedback value θr and provides 3-phase PWM voltage commands VuPWM, VvPWM, and VwPWM. The details of this will be explained.

A difference is calculated between the DC input voltage Vdc1 and a quotient obtained by dividing the DC full voltage Vdc by the number of series-connected inverters (4 in this embodiment). The difference is multiplied by a gain G(s) (s is a Laplacian) to provide a torque command correction value ΔTrqRef, which may zero the difference, as follows:

$$\Delta TrqRef = G(s) \cdot \left(Vdc1 - \frac{Vdc}{4}\right)$$

The following explanation will be made on the assumption that AC motors 131 to 134 are each a permanent-magnet synchronous motor. A current command unit 212 receives a difference between the torque command correction value ΔTrqRef and the torque command TrqRef and uses the difference to calculate d- and q-axis current command values IdRef and IqRef as follows:

$$IdRef = 0$$

$$IqRef = \frac{TrqRef - \Delta TrqRef}{\Phi_{PM} \cdot Po}$$

where $\Phi_{PM}$ is permanent-magnet flux and Po is the number of pole pairs.

A current controller 213 receives the d- and q-axis current command values IdRef and IqRef, U- and W-phase output current feedback values Iu and Iw, and motor rotational position feedback value θr and provides the 3-phase PWM voltage commands VuPWM, VvPWM, and VwPWM as mentioned below.

According to Iu, Iw, and θr, d- and q-axis current feedback values Id and Iq are obtained according to a standard coordinates transformation method as follows:

$$Id = \sqrt{\frac{3}{2}} \cdot \left\{\frac{2}{\sqrt{3}}\left(Iu \cdot \sin\left(\theta r + \frac{2}{3}\pi\right)\right) - Iw \cdot \sin\theta r\right\}$$

$$Iq = \sqrt{\frac{3}{2}} \cdot \left\{\frac{2}{\sqrt{3}}\left(Iu \cdot \cos\left(\theta r + \frac{2}{3}\pi\right)\right) - Iw \cdot \cos\theta r\right\}$$

where θr is a motor rotor phase with d- and q-axis coordinates rotating in synchronization.

To zero a difference between the d-axis current Id and the d-axis current command IdRef as well as a difference between the q-axis current Iq and the q-axis current command IqRef, a current feedback control process is carried out, and d- and q-axis voltage commands Vd and Vq are calculated as follows:

$$Vd = \frac{Kp \cdot s + Ki}{s} \cdot (IdRef - Id)$$

$$Vq = \frac{Kp \cdot s + Ki}{s} \cdot (IqRef - Iq)$$

where Kp is a proportional gain and Ki is an integral gain.

The d- and q-axis voltage commands Vd and Vq and the motor rotor position feedback value θr are used to calculate the 3-phase voltage commands VuPWM, VvPWM, and VwPWM as follows:

$$VuPWM = \sqrt{\frac{2}{3}} \cdot (Vd \cdot \cos\theta r - Vq \cdot \sin\theta r)$$

$$VwPWM = \sqrt{\frac{2}{3}} \cdot \left(Vd \cdot \cos\left(\theta r + \frac{2}{3}\pi\right) - Vq \cdot \sin\left(\theta r + \frac{2}{3}\pi\right)\right)$$

$$VvPWM = -(VuPWM + VwPWM)$$

According to the 3-phase voltage commands and a standard PWM method of triangular wave comparison, the inverter 141 turns on and off semiconductor switching elements to provide a required output voltage.

Like the inverter 141, each of the inverters 142 to 144 is provided with a controller (not shown) to carry out the same control and provide a required output voltage.

In addition to the effect of the first embodiment, the second embodiment with the inverters 141 to 144 connected in series in multiple stages suppresses a DC voltage imbalance caused by the individual differences of current detecting parts and prevents an operation halt due to an overvoltage input to the inverters caused by the DC voltage imbalance.

Figure 7:
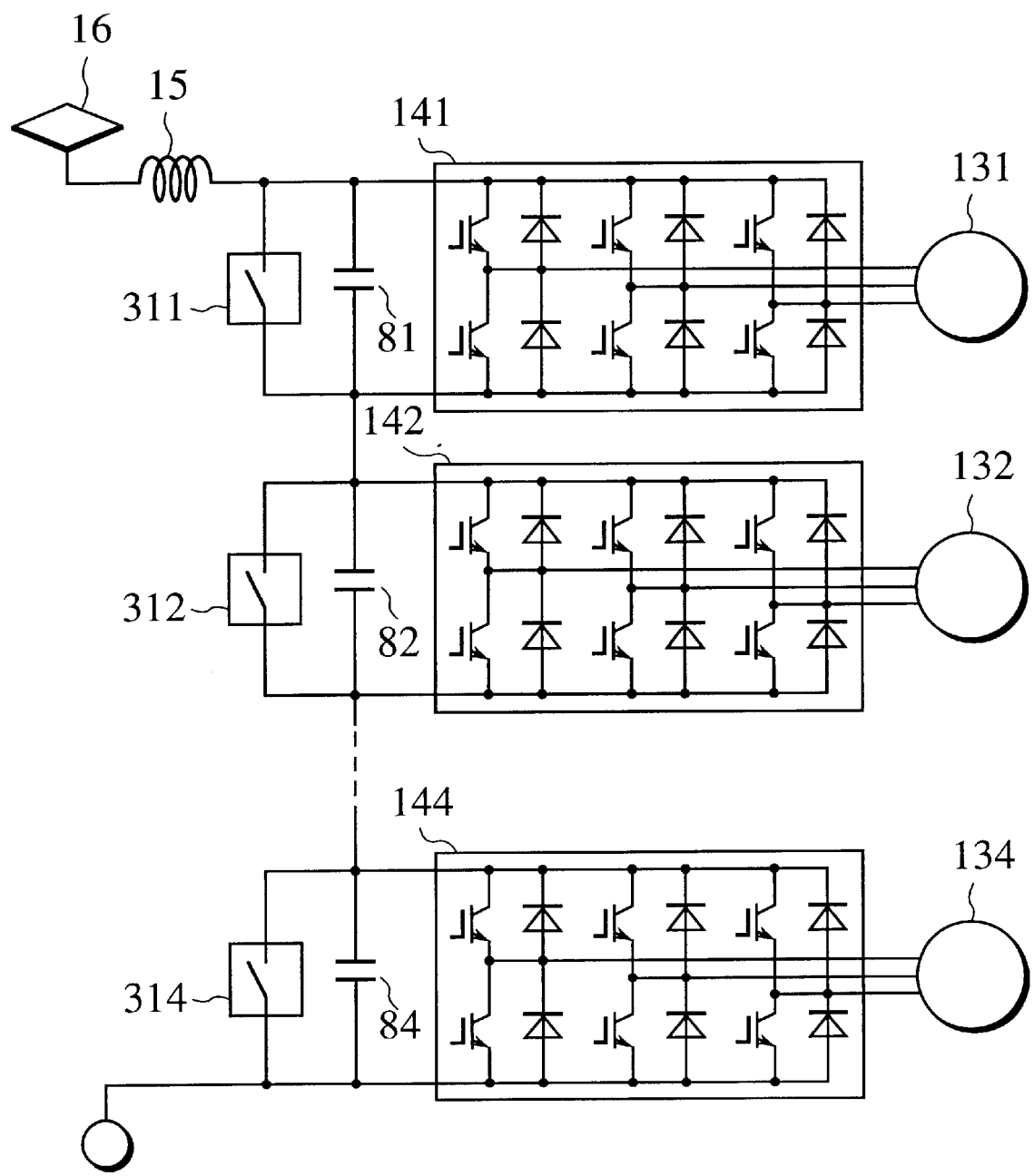
FIG. 7 is a block diagram showing a circuit according to a third embodiment of the present invention.

FIG. 7 shows an apparatus for driving and controlling a car according to the third embodiment of the present invention. In addition to the first embodiment of FIGS. 3 and 4, the third embodiment employs DC input short-circuit switches 311 to 314. Inverters 141 to 144 are connected in series in four stages and are connected to a DC power source. The inverters 141 to 144 have smoothing capacitors 81 to 84, respectively. The short-circuit switches 311 to 314 are arranged in parallel with the capacitors 81 to 84, respectively. The other parts of the third embodiment are the same as those of the first embodiment and are represented with like reference numerals to omit repetitious explanations.

If the inverters 141 to 144 become unable to continue their operations due to, for example, a short-circuit breakdown of semiconductor elements, the short-circuit switches 311 to 314 short-circuit, respectively. If the inverters 141 to 144 are sound, the switches 311 to 314 are open.

A feeder system 16 supplies a DC source voltage of about 1500 V. When the inverters 141 to 144 are made of standard inverters, they may each have a DC withstand voltage of about 500 V. If one of the inverters, for example, the inverter 141 fails, the switch 311 connected in parallel with the inverter 141 is short-circuited so that the remaining inverters evenly divide and bear the DC source voltage of 1500 V to continue their operations. In this case, torque may be reduced to ¾ of full torque. According to the prior art, however, a failure of one inverter causes a total halt of a corresponding motor, although the car is continuously driven by motors of other wheel shafts. Unlike the prior art, the third embodiment minimizes a torque drop when an inverter failure occurs.

In addition to the effect of the first embodiment, the third embodiment provides an effect of minimizing a torque drop and continuously running the car even if some of the inverters 141 to 144 fail.

Figure 8:
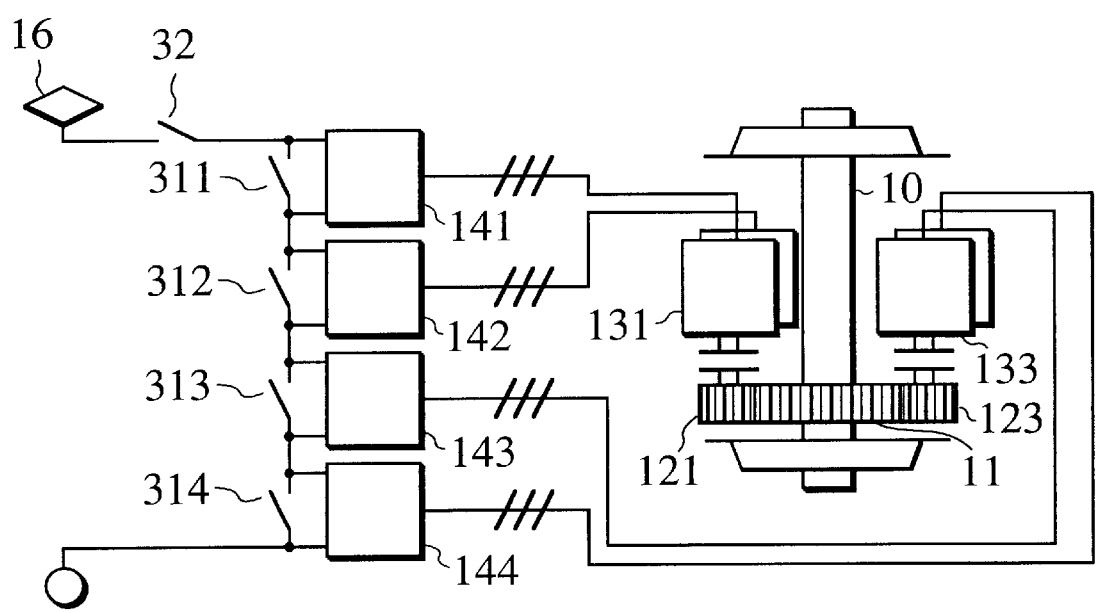
FIG. 8 is a plan view showing a structure according to a fourth embodiment of the present invention.
Figure 9:
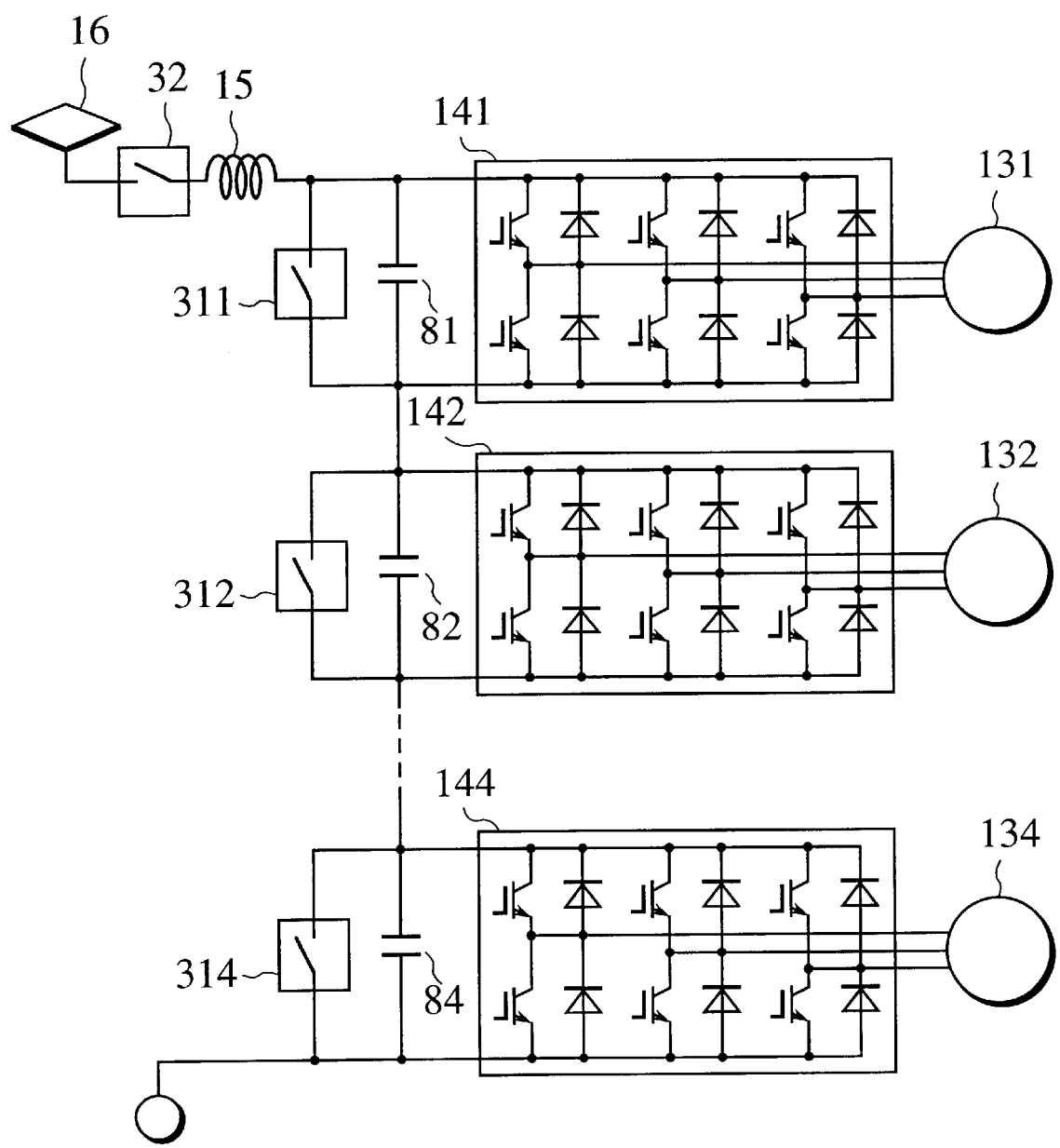
FIG. 9 is a block diagram showing a circuit according to the fourth embodiment.

FIGS. 8 and 9 show an apparatus for driving and controlling a car according to the fourth embodiment of the present invention. In addition to the third embodiment of FIG. 7, the fourth embodiment employs a breaker 32 between a feeder system 16 and a filter reactor 15, for breaking a DC input power to the apparatus. The other parts of the fourth embodiment are the same as those of the third embodiment and are represented with like reference numerals to omit repetitious explanations.

The breaker 32 is closed during a sound operation and is opened to protect circuit elements if an abnormality occurs. If one of inverters 141 to 144, for example, the inverter 141 fails, a DC input short-circuit switch 311 connected to the inverter 141 will be short-circuited, so that the remaining inverters may continue to operate. Under this state, if another car that receives power from the same feeder line uses a regenerative brake, a DC input voltage to the inverters 141 to 144 may exceed a specified value. Then, if each of the inverters 141 to 144 has a DC withstand voltage of 500 V and if a DC input voltage from the feeder system 16 is below 1500 V, the inverters are continuously operated. If the DC input voltage from the feeder system 16 increases to, for example, 1700 V, the breaker 32 is opened to prevent the sound inverters 142 to 144 from being broken by the DC input overvoltage.

In this way, if some of the inverters 141 to 144 fail and if a DC input overvoltage is applied to the remaining sound inverters that are continuously operating, the fourth embodiment opens the disconnection switch 32 to prevent the sound inverters from being broken.

Figure 10:
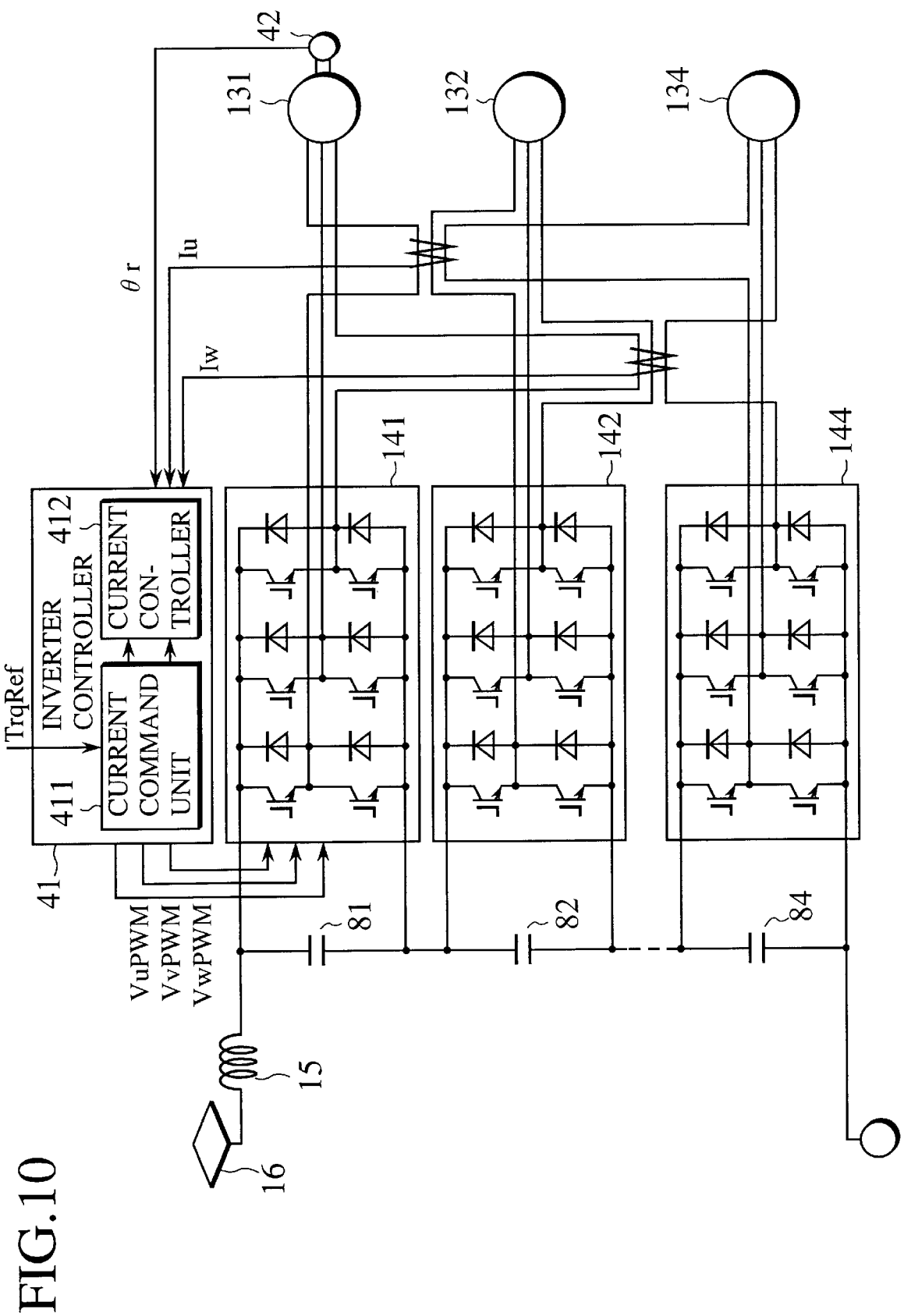
FIG. 10 is a block diagram showing a circuit according to a fifth embodiment of the present invention.

FIG. 10 shows an apparatus for driving and controlling a car according to the fifth embodiment of the present invention. The fifth embodiment is characterized by an inverter controller 41 that collectively controls a plurality of (four in this embodiment) inverters 141 to 144. The other parts of the fifth embodiment are the same as those of the first embodiment of FIGS. 3 and 4 and are represented with like reference numerals.

The inverter controller 41 receives a U-phase current sum Iu for the four inverters 141 to 144, a W-phase current sum Iw for the four inverters 141 to 144, a feedback value θr from a motor rotational position sensor 42 attached to one of four motors, and a torque command value TrqRef for the four motors and provides the four inverters 141 to 144 with 3-phase voltage commands VuPWM, VvPWM, and VwPWM. This will be explained in detail.

The AC motors 131 to 134 are each a permanent-magnet synchronous motor. Gears must-initially be set such that the same rotational angle θr is set between a rotor and a stator U-phase axis in all of the four motors.

A current command unit 411 uses the torque command TrqRef to calculate d- and q-axis current command values IdRef and IqRef as follows:

IdRef=0

$$IqRef = \frac{TrqRef}{\Phi_{PM} \cdot Po}$$

where θ$_{PM}$ is permanent-magnet flux of a motor and Po is the number of pole pairs.

A current controller 412 receives the d- and q-axis current command values IdRef and IqRef, U- and W-phase output current feedback sums Iu and Iw, and motor rotational position feedback value θr and calculates the 3-phase PWM voltage commands VuPWM, VvPWM, and VwPWM as mentioned below.

According to Iu, Iw, and θr, d- and q-axis current feedback values Id and Iq are calculated according to a standard coordinates transformation method as follows:

$$Id = \sqrt{\frac{3}{2}} \cdot \left\{ \frac{2}{\sqrt{3}} \left( Iu \cdot \sin\left(\theta r + \frac{2}{3}\pi\right)\right) - Iw \cdot \sin\theta r \right\}$$

$$Iq = \sqrt{\frac{3}{2}} \cdot \left\{ \frac{2}{\sqrt{3}} \left( Iu \cdot \cos\left(\theta r + \frac{2}{3}\pi\right)\right) - Iw \cdot \cos\theta r \right\}$$

where θr is a motor rotor phase with d- and q-axis coordinates rotating in synchronization.

A current feedback control process is carried out so as to zero a difference between the d-axis current Id and the d-axis current command IdRef and a difference between the q-axis current Iq and the q-axis current command IqRef, and d- and q-axis voltage commands Vd and Vq are calculated as follows:

$$Vd = \frac{Kp \cdot s + Ki}{s} \cdot (IdRef - Id)$$

$$Vq = \frac{Kp \cdot s + Ki}{s} \cdot (IqRef - Iq)$$

where Kp is a proportional gain and Ki is an integral gain.

The d- and q-axis voltage commands Vd and Vq and motor rotational position feedback value θr are used to calculate the 3-phase voltage commands VuPWM, VvPWM, and VwPWM as follows:

$$VuPWM = \sqrt{\frac{2}{3}} \cdot (Vd \cdot \cos\theta r - Vq \cdot \sin\theta r)$$

$$VwPWM = \sqrt{\frac{2}{3}} \cdot \left( Vd \cdot \cos\left(\theta r + \frac{2}{3}\pi\right) - Vq \cdot \sin\left(\theta r + \frac{2}{3}\pi\right)\right)$$

VvPWM=−(VuPWM+VwPWM)

According to the 3-phase voltage commands and standard a standard PWM method of triangular wave comparison, the inverters 141 to 144 turn on and off semiconductor switching elements thereof to provide a required output voltage.

In addition to the effect of the first embodiment, the fifth embodiment provides an effect of automatically equalizing a DC voltage to continue the power running of the car without the special DC voltage balancing control of the second embodiment.

Figure 11:
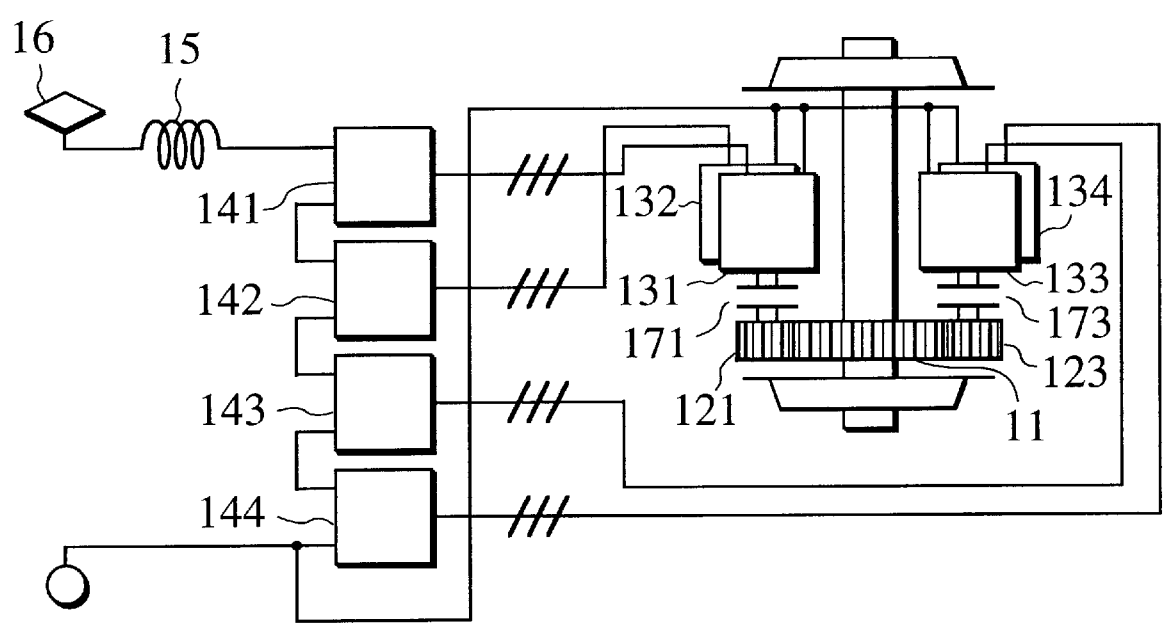
FIG. 11 is a plan view showing a structure according to a sixth embodiment of the present invention.
Figure 12:
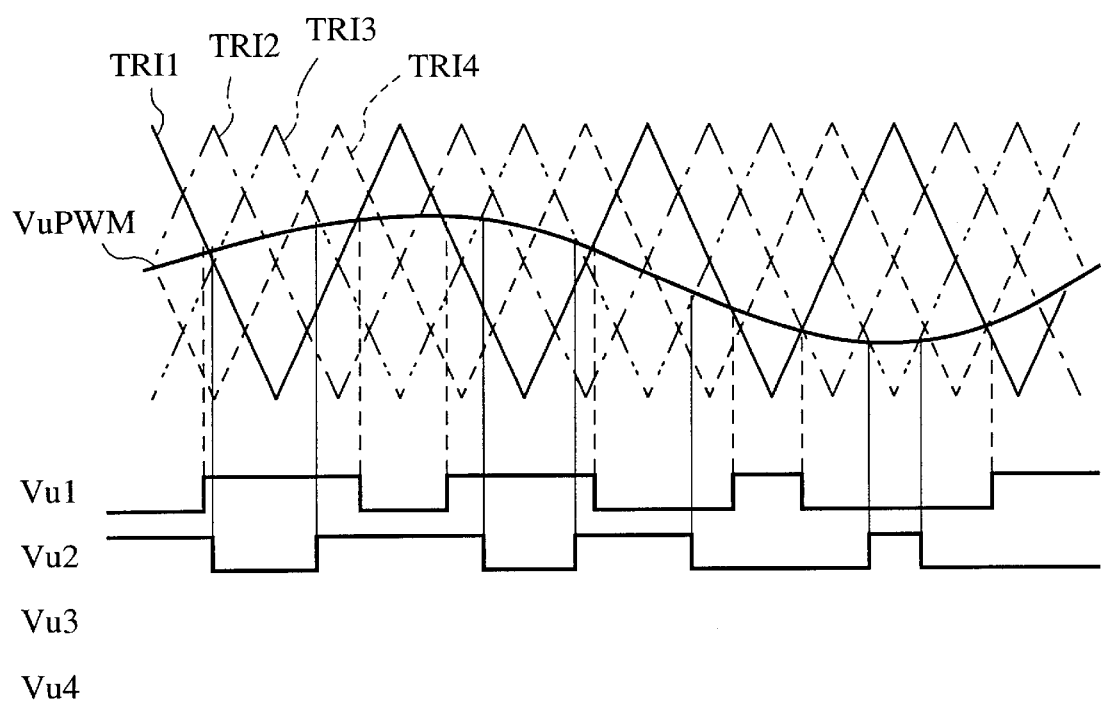
FIG. 12 is a waveform diagram showing an inverter PWM operation according to the sixth embodiment.

FIGS. 11 and 12 show an apparatus for driving and controlling a car according to the sixth embodiment of the present invention. A circuit structure of the sixth embodiment is the same as that of the first embodiment of FIGS. 3 and 4. The sixth embodiment is characterized by PWM pulse patterns provided by inverters 141 to 144. For example, a PWM pulse pattern provided by the inverter 141 is determined by comparing voltage commands VuPWM, VvPWM, and VwPWM with a carrier triangular wave TRI1 as follows:

if VuPWM>TRI1 then Vu1=1 if VuPWM<TRI1 then Vu1=0 where the triangular wave TRI1 has an amplitude of Vdc/2 with a frequency $f_{TRI}$ of, for example, 200 Hz.

Triangular waves TRI2 to TRI4 for the inverters 142 to 144 have phase shifts of ¼, 2/4, and ¾, respectively, of a triangular wave frequency Ttri (=1/$f_{TRI}$) with respect to the triangular wave TRI1 for the inverter 141.

The number of series-connected inverters of this embodiment is four. This number is optional with proper phase shifts determined accordingly.

Frames (external casings) of AC motors 131 to 134 are electrically short-circuited to one another and are electrically connected to a negative terminal of a power source through wheels and rails to ground.

With these arrangements, the sixth embodiment reduces a high-frequency leakage current to the ground caused by the PWM switching of the inverters and maintains the quality of signals and communication.

Figure 13:
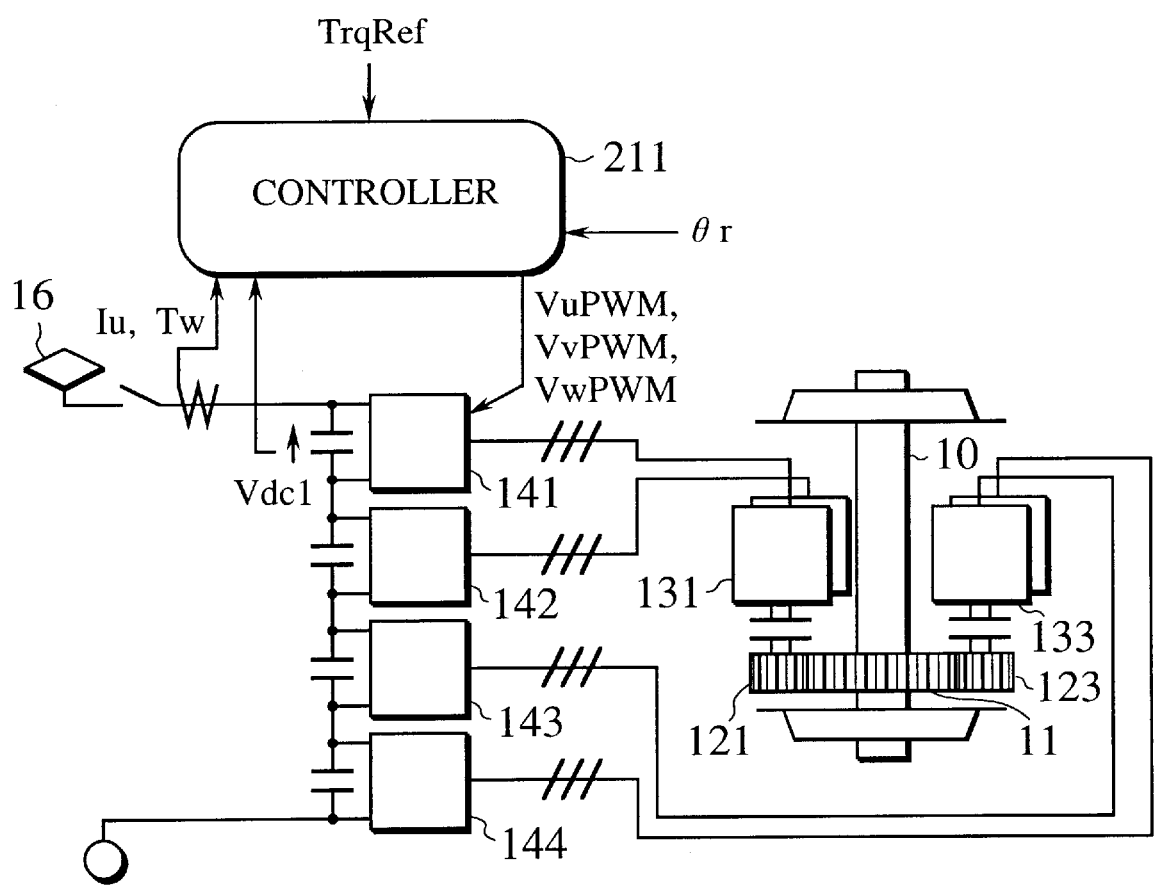
FIG. 13 is a plan view showing a structure according to a seventh embodiment of the present invention.
Figure 14:
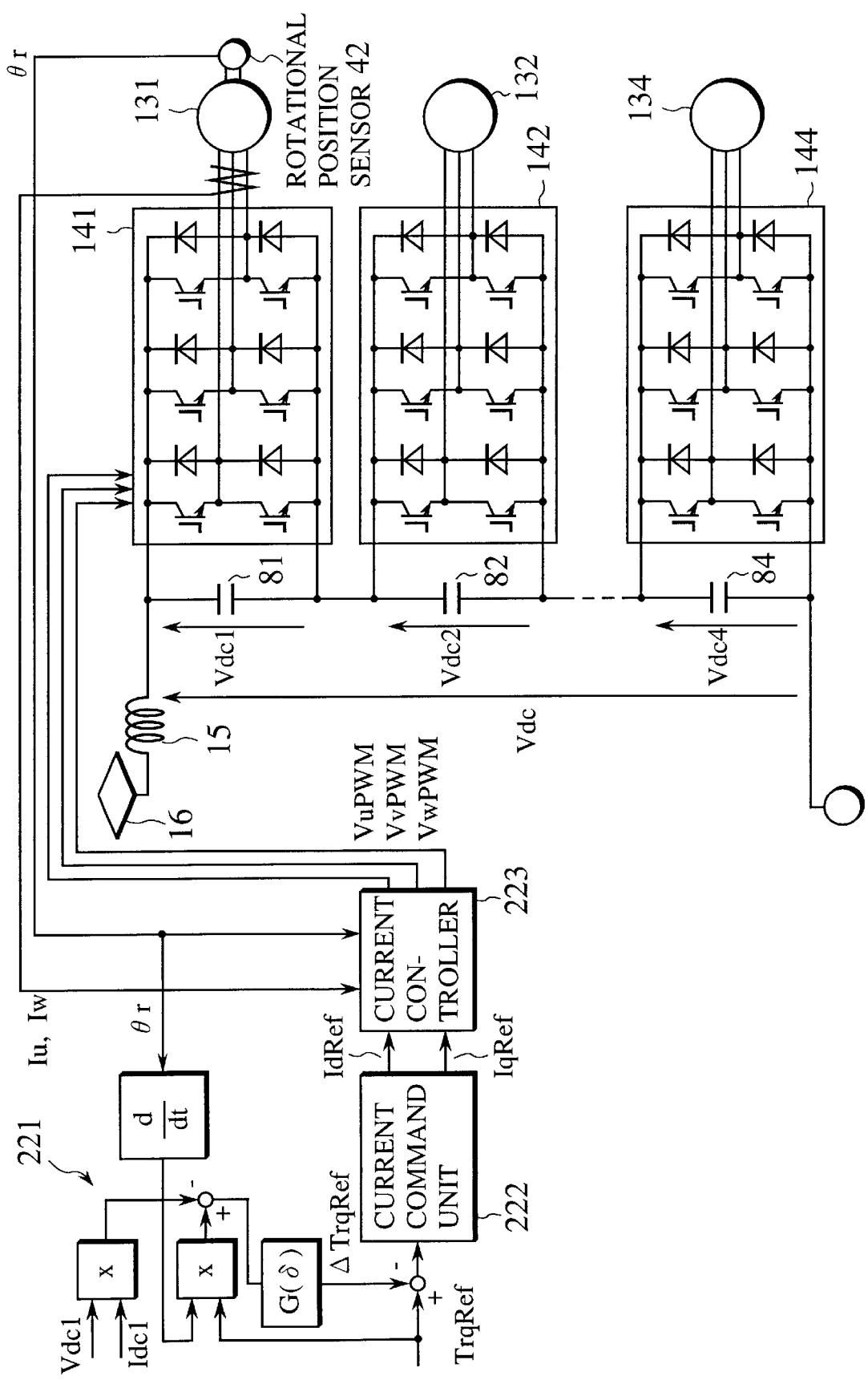
FIG. 14 is a block diagram showing a circuit according to the seventh embodiment.

FIGS. 13 and 14 show an apparatus for driving and controlling a car according to the seventh embodiment of the present invention. The same parts as those of the first embodiment of FIGS. 3 and 4 are represented with like reference numerals in FIGS. 13 and 14. Characteristic parts of the seventh embodiment will be explained.

An inverter 141 has a controller 221. The controller 221 receives a DC input voltage Vdc1 for the inverter 141, a DC input current Idc1 for the inverter 141, a torque command TrqRef from a motorman cab, U- and W-phase output current feedback values Iu and Iw, and a motor rotational position feedback value θr and provides 3-phase PWM voltage instructions VuPWM, VvPWM, and VwPWM. This will be explained in detail.

An output effective power command PowerRef is calculated as follows:

$$PowerRef = \frac{d\theta r}{dt} \cdot TrqRef$$

An output effective power Power1 is calculated as follows:

Power1=Vdc1·Idc1

The torque command TrqRef is corrected so that the output effective power Power1 may follow the output effective power command PowerRef. A torque command correction value ΔTrqRef is calculated as follows:

ΔTrqRef=G(s)·(PowerRef−Power1)

To zero a difference between the DC effective power Power1 and the output effective power command PowerRef, the torque command correction value ΔTrqRef is calculated by multiplying the difference by a gain G(s) (s is a Laplacian).

The following explanation is made on the assumption that AC motors 131 to 134 are each a permanent-magnet synchronous motor. A current command unit 222 subtracts the torque command correction value ΔTrqRef from the torque command TrqRef and uses the difference to calculate d- and q-axis current command values IdRef and IqRef as follows:

$$IdRef = 0$$

$$IqRef = \frac{TrqRef - \Delta TrqRef}{\Phi_{PM} \cdot Po}$$

where $\Phi_{PM}$ is permanent-magnet flux and Po is the number of pole pairs.

A current controller 223 receives the d- and q-axis current command values IdRef and IqRef, U- and W-phase output current feedback values Iu and Iw, and motor rotational position feedback value θr and provides the 3-phase PWM voltage commands VuPWM, VvPWM, and VwPWM as mentioned below.

According to Iu, Iw, θr, and a standard coordinates translation expression, d- and q-axis current feedback values Id and Iq are obtained as follows:

$$Id = \sqrt{\frac{3}{2}} \cdot \left\{ \frac{2}{\sqrt{3}} \left( Iu \cdot \sin\left(\theta r + \frac{2}{3}\pi\right) \right) - Iw \cdot \sin\theta r \right\}$$

$$Iq = \sqrt{\frac{3}{2}} \cdot \left\{ \frac{2}{\sqrt{3}} \left( Iu \cdot \cos\left(\theta r + \frac{2}{3}\pi\right) \right) - Iw \cdot \cos\theta r \right\}$$

where θr is a motor rotor phase with d- and q-axis coordinates rotating in synchronization.

A current feedback control process is carried out to zero a difference between the d-axis current Id and the d-axis current command IdRef as well as a difference between the q-axis current Iq and the q-axis current command IqRef, and d- and q-axis voltage commands Vd and Vq are calculated as follows:

$$Vd = \frac{Kp \cdot s + Ki}{s} \cdot (IdRef - Id)$$

$$Vq = \frac{Kp \cdot s + Ki}{s} \cdot (IqRef - Iq)$$

where Kp is a proportional gain and Ki is an integral gain.

The d- and q-axis voltage commands Vd and Vq and motor rotational position feedback value θr are used to calculate the 3-phase voltage commands VuPWM, VvPWM, and VwPWM as follows:

$$VuPWM = \sqrt{\frac{2}{3}} \cdot (Vd \cdot \cos\theta r - Vq \cdot \sin\theta r)$$

$$VwPWM = \sqrt{\frac{2}{3}} \cdot \left( Vd \cdot \cos\left(\theta r + \frac{2}{3}\pi\right) - Vq \cdot \sin\left(\theta r + \frac{2}{3}\pi\right) \right)$$

VvPWM=−(VuPWM+VwPWM)

According to the 3-phase voltage commands and a standard PWM method of triangular wave comparison, the inverter 141 turns on and off semiconductor switching elements thereof and provides a required output voltage.

The inverters 142 to 144 have each the same controller (not shown) as that of the inverter 141, to carry out the like control and provide a required output voltage.

The seventh embodiment connects the inverters 141 to 144 in series in multiple stages like the second embodiment. In addition to the effect of the first embodiment, the seventh embodiment provides effects of suppressing a DC voltage imbalance caused by the individual differences of current detecting parts and preventing an operation halt due to an inverter input overvoltage caused by the DC voltage imbalance, like the second embodiment.

Figure 15:
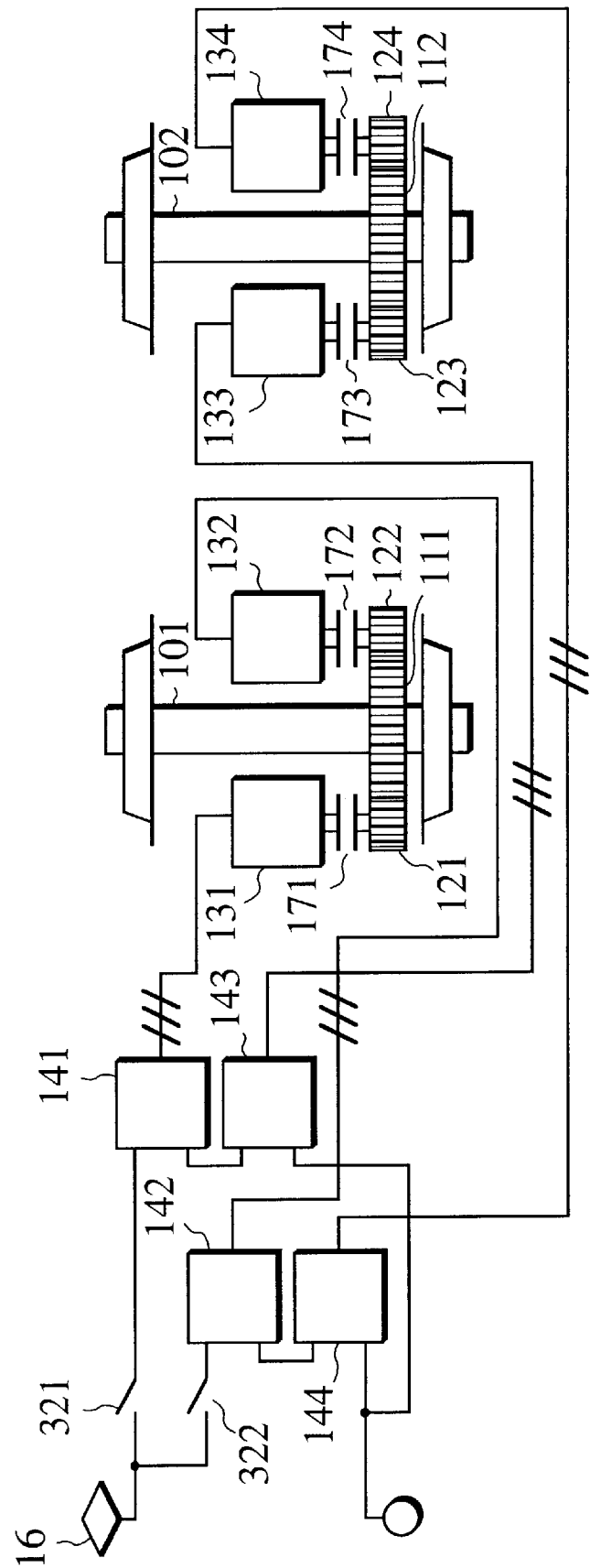
FIG. 15 is a plan view showing a structure according to an eighth embodiment of the present invention.

FIG. 15 shows an apparatus for driving and controlling a car according to the eighth embodiment of the present invention. The apparatus includes a large gear 111 directly connected to a first wheel shaft 101, a large gear 112 directly connected to a second wheel shaft 102, two small gears 121 and 122 meshing with the large gear 111, two small gears 123 and 124 meshing with the large gear 112, four AC motors 131 to 134, four inverters 141 to 144, a feeder system 16, four flexible joints 171 to 174, and two breakers 321 and 322.

The large gear 111 is coaxial to and directly connected to the first wheel shaft 101 and is mechanically arranged to mesh with the small gears 121 and 122. Torque generated by the AC motors 131 and 132 is transmitted to the small gears 121 and 122 and then to the large gear 111. The torque is amplified by a gear ratio defined by the gears, to drive wheels.

The large gear 112 is coaxial to and directly connected to the second wheel shaft 102 and is mechanically arranged to mesh with the small gears 123 and 124. Torque generated by the AC motors 133 and 134 is transmitted to the small gears 123 and 124 and then to the large gear 112. The torque is amplified by a gear ratio defined by the gears, to drive wheels.

The small gears 121 to 124 are connected to rotor shafts of the AC motors 131 to 134 through the flexible joints 171 to 174, respectively. The flexible joints 171 to 174 transmit torque generated by the AC motors 131 to 134 to the small gears 121 to 124 even if the axial centers of the AC motors 131 to 134 installed on a truck 9 (not shown in FIG. 15, refer to FIG. 3) deviate from the axial centers of the small gears 121 to 124 installed on the wheel shafts 101 and 102 due to a spring mechanism of the truck 9.

The AC motors 131 to 134 are each a 3-phase AC motor that receives 3-phase power from the inverters 141 to 144, respectively. The AC motors 131 to 134 may each be a permanent-magnet synchronous motor, an induction motor, or a reluctance motor.

The inverters 141 to 144 may each be a standard 3-phase PWM inverter that employs the switching operation of power semiconductor elements such as IGBTs to provide a required 3-phase AC voltage from a constant-voltage direct current. Smoothing capacitors 81 to 84 (not shown in FIG. 15, refer to FIG. 4) are connected between positive and negative DC input terminals of the inverters 141 to 144, respectively. A negative terminal of the inverter 141 on the first wheel shaft 101 is connected to a positive terminal of the inverter 143 on the second wheel shaft 102 in series. A negative terminal of the inverter 142 on the first wheel shaft 101 is connected to a positive terminal of the inverter 144 on the second wheel shaft 102 in series.

The feeder system 16 is a pantograph that mechanically and electrically contacts with a feeder line to receive DC power therefrom. The feeder system 16 is connected to a positive DC input terminal of the inverter 141 through the breaker 321, as well as to a positive DC input terminal of the inverter 142 through the breaker 322.

A negative DC terminal of each of the inverters 143 and 144 is electrically connected to a negative terminal of the power source through wheels and rails.

The feeder system 16 supplies a DC source voltage through the breakers 321 and 322. The DC source voltage is halved and supplied to the inverters 141 and 143 connected in series in two stages, as well as to the inverters 142 and 144 connected in series in two stages. The inverters convert the source voltage into 3-phase AC power of a required frequency, which is supplied to the respective AC motors 131 to 134 to drive them. The AC motors 131 to 134 rotate the small gears 121 to 124 through the flexible joints 171 to 174, to rotate the large gears 111 and 112 meshing with the small gears, thereby rotating the first and second wheel shafts 101 and 102 directly connected to the large gears and two wheels directly connected to the wheel shafts to ground.

The two wheels receive equal torque (each wheel receiving ½ of the torque of the first embodiment). This arrangement distributes and reduces torque applied to the small gears 121 to 124. As a result, like the first embodiment, the eighth embodiment enables the cross-sectional area of each tooth of each small gear to be reduced, to increase a gear ratio. Increasing a gear ratio enables a motor to rotate at high speed, thereby reducing the size, weight, and cost of the apparatus.

If, for example, the inverter 141 stops due to a semiconductor element short-circuit failure, only the breaker 321 is opened, and the breaker 322 is kept closed. Under this state, the inverters 142 and 144 are normally operated so that the two wheel shafts 101 and 102 may continuously be driven although driving force thereof is dropped to half the normal condition.

Under this state, the current and torque of the sound inverters 142 and 144 and AC motors 132 and 134 may be increased to maintain the driving force of the car. Even so, the torque is. divided to the two wheel shafts 101 and 102. Therefore, compared with transmitting torque to rails through a single wheel shaft, transmitting the same torque to rails through two wheel shafts reduces a risk of causing wheels to idle on the rails, thereby securing acceleration for the car.

Figure 16A:
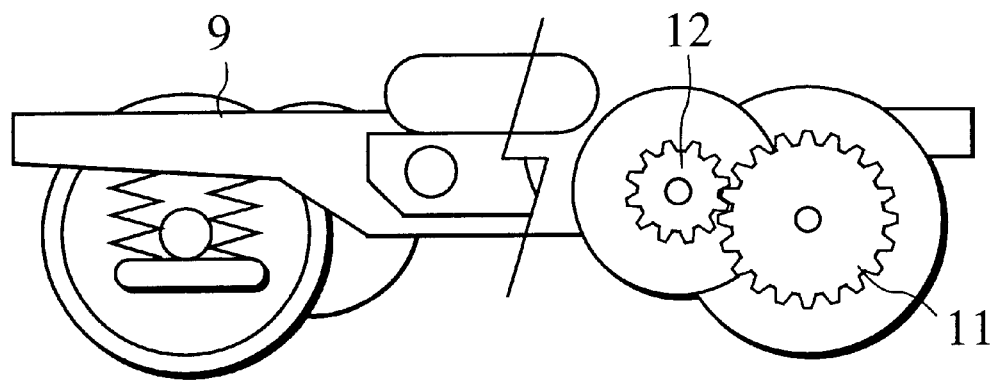
FIGS. 16A and 16B are front and plan views showing a structure according to a ninth embodiment.
Figure 16B:
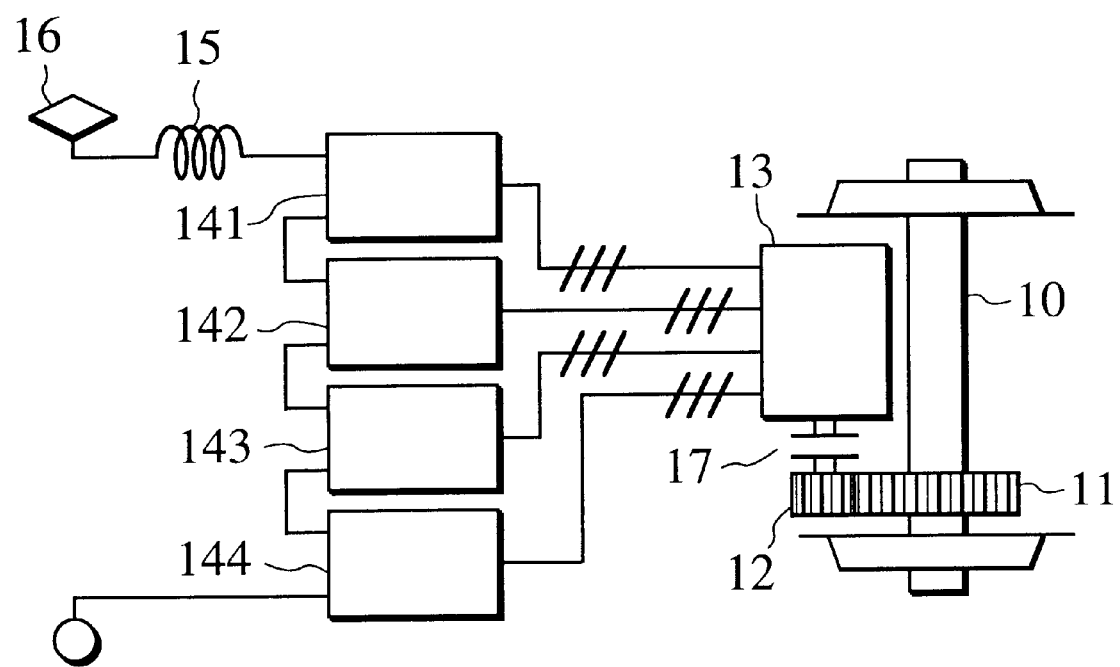

FIGS. 16 and 17 show an apparatus for driving and controlling a car according to the ninth embodiment of the present invention. The apparatus includes a large gear 11, a small gear 12, a 12-phase AC motor 13, i.e., a 3-by-n-phase AC motor operating on 3-phase AC input with n being 4, n (=4 in this example) inverters 141 to 144, a filter reactor 15, a feeder system 16, and a flexible joint 17.

The 12-phase AC motor 13 has a stator made of 12 slots. Each of the slots receives identical-phase windings of the four inverters 141 to 144. Each set of three-phase windings connected to the inverters 141 to 144 is short-circuited at a neutral point, and four neutral points are electrically isolated from one another.

The small gear 12 is connected to a rotator shaft of the AC motor 13 through the flexible joint 17 and meshes with the large gear 11. The flexible joint 17 transmits torque generated by the AC motor 13 to the small gear 12 even if the axial center of the AC motor 13 installed on a truck 9 deviates from the axial center of the small gear 12 installed on the wheel shaft 10 due to a spring mechanism of the truck 9.

The inverters 141 to 144 may each be a standard 3-phase PWM inverter that employs the switching operation of power semiconductor elements such as IGBTs to provide a required 3-phase AC voltage from a constant-voltage direct current. Smoothing capacitors 81 to 84 (not shown in FIGS. 16 and 17, refer to FIG. 4) are connected between positive and negative DC input terminals of the inverters 141 to 144, respectively. The DC input sides of the inverters 141 to 144 are connected in series in four stages.

The feeder system 16 is a pantograph that mechanically and electrically contacts with a feeder line to receive DC power therefrom. The feeder system 16 is connected to a positive DC input terminal of the inverter 141 through the filter reactor 15.

The filter reactor 15 prevents harmonics caused by the PWM switching of the inverters from leaking to the feeder line and reduces a short-circuit current when any one of the inverters causes a DC short-circuit failure.

A negative DC input terminal of the inverter 144 is electrically connected to a negative power source terminal through wheels and rails to ground.

The feeder system 16 supplies a DC source voltage through the filter reactor 15. The DC source voltage is divided by four, and the divided voltages are supplied to the series-connected inverters 141 to 144, respectively. The inverters provide 3-phase AC power of a required frequency to the windings of the AC motor 13 connected thereto. The AC motor 13 drives the small gear 12 through the flexible joint 17, to drive the large gear 11 meshing with the small gear 12, thereby driving the wheel shaft 10 directly connected to the large gear and wheels.

The DC input terminals of the inverters 141 to 144 are connected in series to receive power from the high-voltage feeder line, to reduce a DC input voltage to each inverter to a standard inverter level, thereby minimizing the harmonic induction problem. The inverters 141 to 144 may be mass-produced standard inverters, to reduce the cost of the apparatus and improve the reliability thereof.

The ninth embodiment is capable of controlling the inverters 141 to 144 in the same manner as the second embodiment of FIGS. 5 and 6. Since the ninth embodiment drives a single AC motor, a motor rotational position feedback value θr is fetched from the single AC motor 13. With the inverters 141 to 144 connected in series in multiple stages like the second embodiment, the ninth embodiment suppresses a DC voltage imbalance caused by the individual differences of current detecting parts and prevents an operation halt due to an inverter input overvoltage caused by the DC voltage imbalance.

Like the third embodiment of FIG. 7, the ninth embodiment may provide DC input short-circuit switches 311 to 314 for the inverters 141 to 144, respectively. If any one of the inverters, for example, the inverter 141 fails, the short-circuit switch 311 is short-circuited, and the remaining sound inverters 142 to 144 continuously operate. Even if some of the inverters fail, this arrangement minimizes a torque drop and continuously drives the car.

The ninth embodiment may employ the breaker 32 of the fourth embodiment of FIGS. 8 and 9. In this case, a control mode of the ninth embodiment that drives only one AC motor is as mentioned below.

If the AC motor 13 is a permanent-magnet synchronous motor, the motor causes an AC induction voltage when driven, irrespective of the operation of the inverters. If at least one of the inverters 141 to 144 causes a short-circuit failure, the operation of the failed inverter will be stopped. Even if the failed inverter is stopped, the motor induced voltage produces a short-circuit torque current, which may extensively break the failed inverter or generate unwanted braking force. This results in the sliding and grinding of wheels to make the wheels unable to rotate. To prevent this, the breaker 32 is opened if some inverters fail. At the same time, the remaining sound inverters are controlled as mentioned below, to pass a current in a direction to cancel the motor induced voltage.

A d-axis current command IdRef is set as follows:

$$IdRef = -\frac{\Phi_{PM}}{Ld}$$

where Id is a d-axis current, $\Phi_{PM}$ is permanent-magnet flux, and Ld is a d-axis inductance.

To secure a DC voltage for operating the inverters, a q-axis current command IqRef is set to a value of −Iq0, which is obtained from regenerative torque to keep the smoothing capacitors 81 to 84 in a charged state.

IqRef=−Iq0

It is possible to form a feedback loop that feeds back a corresponding one of DC capacitor voltages Vdc1 to Vdc4 and adjusts the q-axis current command IqRef to maintain the fed-back voltage at a constant value.

This control process enables the AC motor to be a permanent-magnet synchronous motor having a high induction voltage, high efficiency, and small size.

Figure 18:
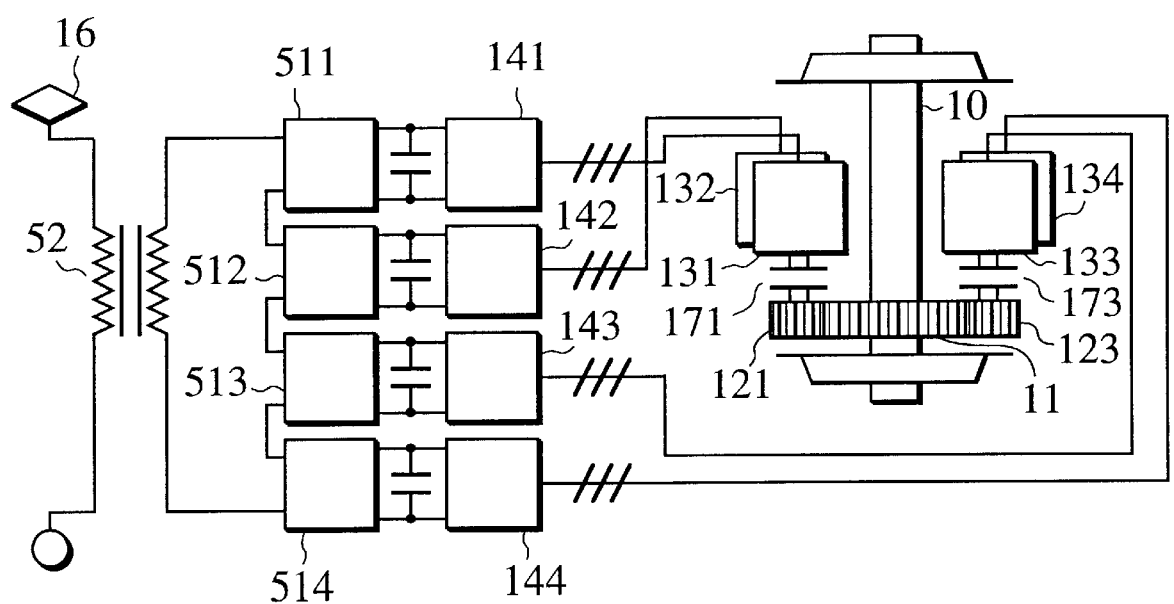
FIG. 18 is a plan view showing a structure according to a 10th embodiment of the present invention.
Figure 19:
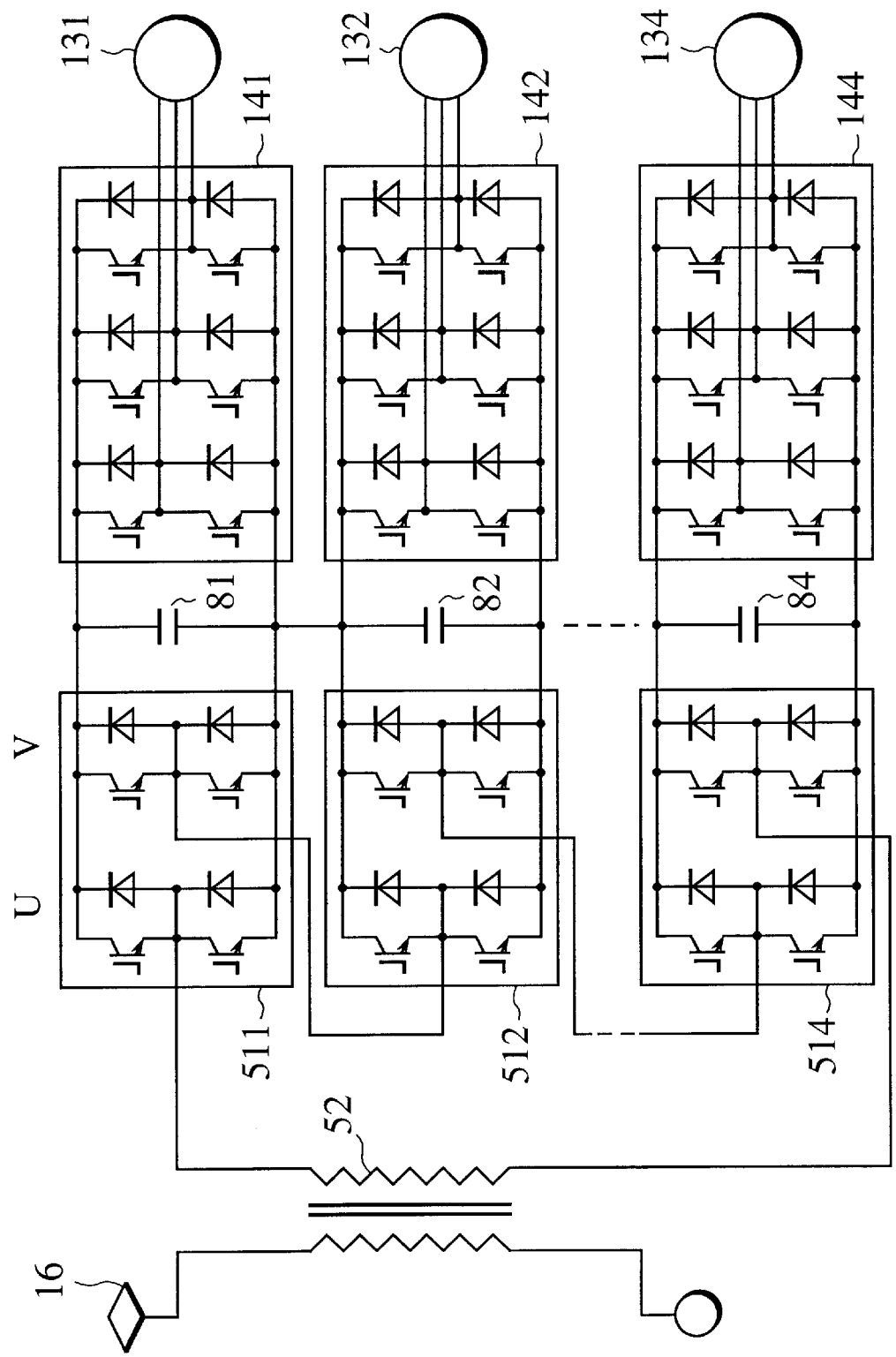
FIG. 19 is a block diagram showing a circuit according to the 10th embodiment.

FIGS. 18 and 19 show an apparatus for driving and controlling a car according to the 10th embodiment of the present invention. The apparatus includes a large gear 11, four small gears 121 to 124, four AC motors 131 to 134, four inverters 141 to 144, a feeder system 16, four flexible joints 171 to 174, and four converters 511 to 514.

The structures and operations of the large gear 11, small gears 121 to 124, flexible joints 171 to 174, and AC motors 131 to 134 are the same as those of the first embodiment of FIGS. 3 and 4.

The inverters 141 to 144 are each a standard 3-phase PWM inverter that provides a required 3-phase AC voltage from a constant-voltage direct current with the use of the switching of power semiconductor elements such as IGBTs. Smoothing capacitors 81 to 84 are connected between positive and negative DC input terminals of the inverters 141 to 144, respectively, and are connected to DC output terminals of the converters 511 to 514, respectively.

Similar to the inverters, the converters 511 to 514 are each a standard single-phase PWM converter that provides a required DC voltage from a single-phase AC voltage with the use of the switching of power semiconductor elements such as IGBTs. DC output terminals of the converters 511 to 514 are connected to DC input terminals of the inverters 141 to 144, respectively. A V-phase AC input terminal of the converter 511 is connected to a U-phase AC input terminal of the converter 512. A V-phase AC input terminal of the converter 512 is connected to a U-phase AC input terminal of the converter 513. A V-phase AC input terminal of the converter 513 is connected to a U-phase AC input terminal of the converter 514.

A U-phase AC input terminal of the converter 511 is connected to an end of a low-voltage secondary winding of a transformer 52. A V-phase AC input terminal of the converter 514 is electrically connected to the other end of the same secondary winding of the transformer 52.

The feeder system 16 is a pantograph that mechanically and electrically contacts with an AC feeder line and receives power therefrom. The pantograph is electrically connected to an end of a high-voltage primary winding of the transformer 52. The other end of the high-voltage primary winding of the transformer 52 is grounded through wheels and rails.

The feeder system 16 supplies an AC source voltage from the feeder line to the transformer 52, and a voltage from the transformer 52 is converted by the converters 511 to 514 into direct currents having a predetermined voltage. The direct currents are supplied to the inverters 141 to 144, respectively. The inverters 141 to 144 provide 3-phase AC power of a required frequency to drive the AC motors 131 to 134, respectively.

The AC motors 131 to 134 drive the small gears 121 to 124 through the flexible joints 171 to 174 to drive the large gear 11 meshing with the small gears 121 to 124. The large gear 11 drives the wheel shaft 10 directly connected to the large gear 11 and wheels.

With these arrangements, the 10th embodiment distributes and reduces torque borne by each of the small gears 121 to 124. This enables the cross-sectional area of each tooth of each gear to be reduced, thereby increasing a gear ratio. Increasing a gear ratio enables a motor to be driven at high speed. This makes the apparatus be small, light-weight, and low-cost. High-voltage AC power from the feeder line is converted by the series-connected four converters 511 to 514 into DC power of a 1/4 voltage, which is supplied to the inverters 141 to 144. Namely, the DC input voltage to each inverter is reduced to a standard inverter level, to minimize the harmonic induction problem. In addition, the inverters 141 to 144 may be mass-produced standard inverters to reduce the cost of the apparatus and improve the reliability thereof.

In addition, the converters 511 to 514 that are connected in series and multiplexed apply multi-level PWM voltages to the secondary winding of the transformer 52, to prevent harmonics from leaking to the feeder line serving as a power source. This reduces the heat loss and noise of the transformer 52 due to the harmonics.

Figure 20:
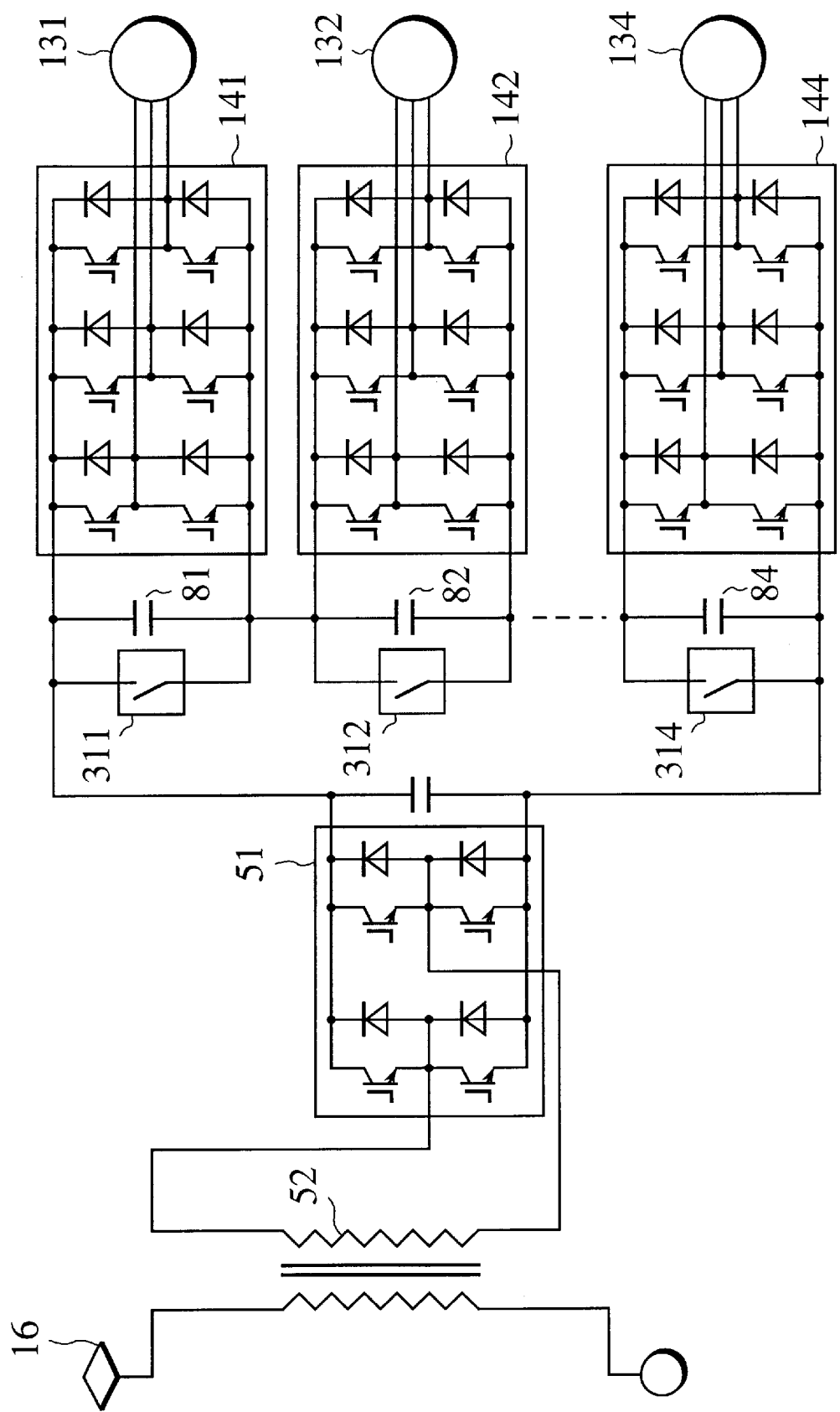
FIG. 20 is a block diagram showing a circuit according to an 11th embodiment of the present invention.

FIG. 20 shows an apparatus for driving and controlling a car according to the 11th embodiment of the present invention. The mechanical structure of the 11th embodiment is the same as that of the 10th embodiment of FIG. 18, although the 11th embodiment employs only one converter. The 11th embodiment employs four small gears 121 to 124, four AC motors 131 to 134, four flexible joints 171 to 174 for connecting the small gears 121 to 124 to the AC motors 131 to 134, respectively, four inverters 141 to 144, smoothing capacitors 81 to 84, inverter DC short-circuit switches 311 to 314, the converter 51 for supplying power to the inverters 141 to 144, a transformer 52, and a feeder system 16.

The inverters 141 to 144 are the same as those of the 10th embodiment of FIG. 19. The converter 51 is a single-phase PWM converter that produces a required DC voltage from a single-phase AC voltage with the use of the switching of power semiconductor elements such as IGBTs. A U-phase AC input terminal of the converter 51 is connected to an end of a low-voltage secondary winding of the transformer 52, and a V-phase AC input terminal of the converter 51 is connected to the other end of the secondary winding of the transformer 52.

A positive DC output terminal of the converter 51 is connected to a positive DC input terminal of the inverter 141, and a negative DC output terminal of the converter 51 is connected to a negative DC input terminal of the inverter 144. Namely, the DC output of the converter 51 is connected to the series-connected four inverters 141 to 144.

The inverters 141 to 144 may each have a DC withstand voltage of about 500 V, and in a normal state, the DC output voltage of the converter 51 is set to 2000 V, which is four times 500 V of each of the four inverters connected in series. If one of the inverters 141 to 144, for example, the inverter 141 fails, the DC short-circuit switch 311 of the inverter 141 is short-circuited, and the DC output voltage of the converter 51 is changed to 1500 V, which is three times 500 V of each of the sound inverters 142 to 144 connected in series.

This arrangement minimizes an output torque drop to ¾ of a normal level, when one of the inverters fails. On the other hand, the prior art zeroes motor torque for a relevant wheel shaft even for a single inverter failure. Under a normal condition, the 11th embodiment operates each inverter with a DC input voltage of 500V to fully utilize the withstand voltage of each inverter and minimize a power margin with respect to required output power.

Figure 21:
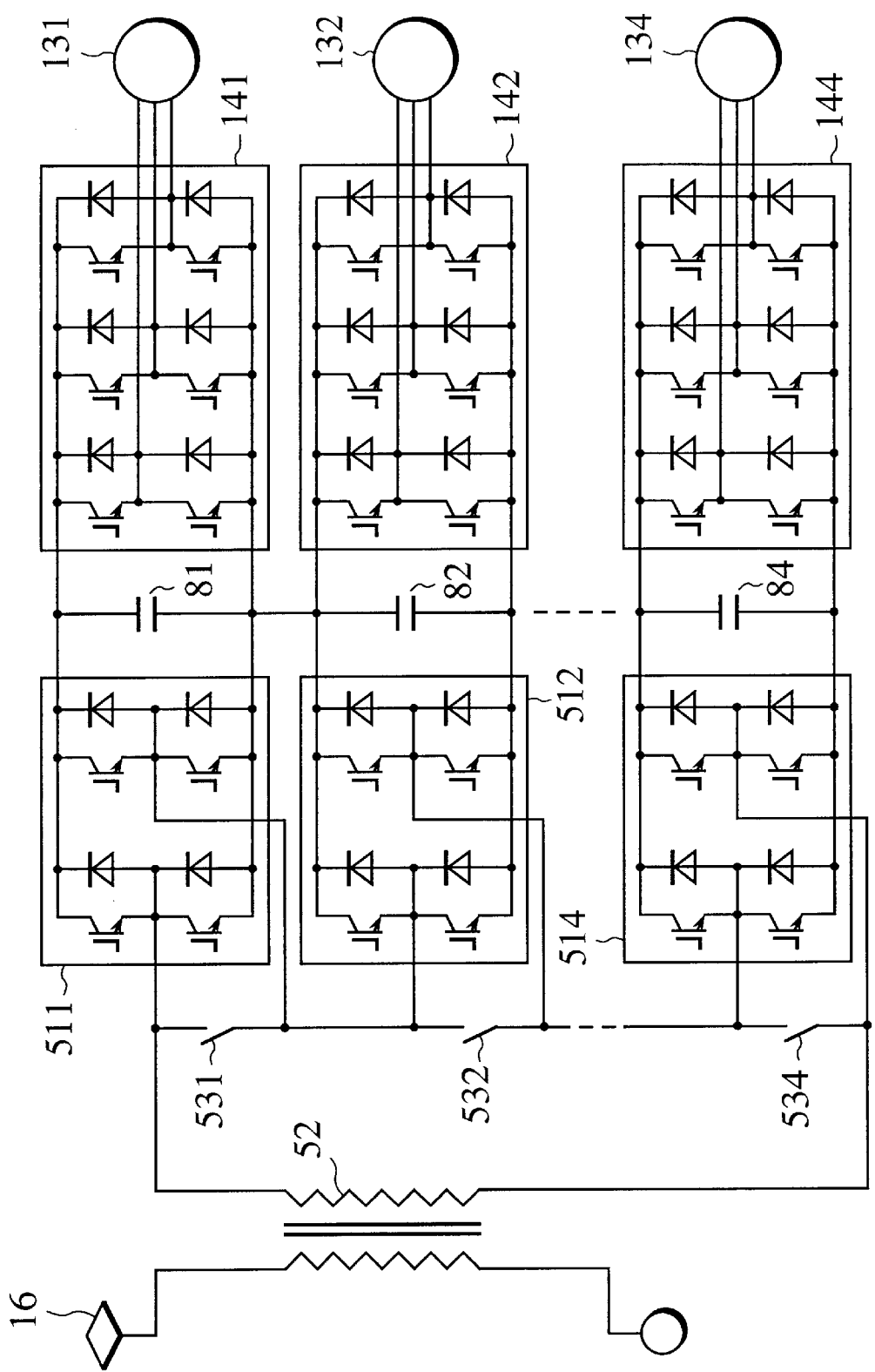
FIG. 21 is a block diagram showing a circuit according to a 12th embodiment of the present invention.

FIG. 21 shows an apparatus for driving and controlling a car according to the 12th embodiment of the present invention. In addition to the 10th embodiment of FIGS. 18 and 19, the 12th embodiment employs AC input short-circuit switches 531 to 534 on the AC input sides of four converters 511 to 514, respectively. The other parts of the 12th embodiment are the same as those of the 10th embodiment of FIGS. 18 and 19.

The short-circuit switches 531 to 534 are connected between AC input terminals of the converters 511 to 514, respectively. If any one of the converters 511 to 514 or inverters 141 to 144 fails, a corresponding one of the short-circuit switches is closed to short-circuit the converter so that the remaining sound converters and inverters may continue to operate.

Even if some of the converters or inverters fail, the 12th embodiment minimizes a torque drop and continues the operation of the car.

Figure 22:
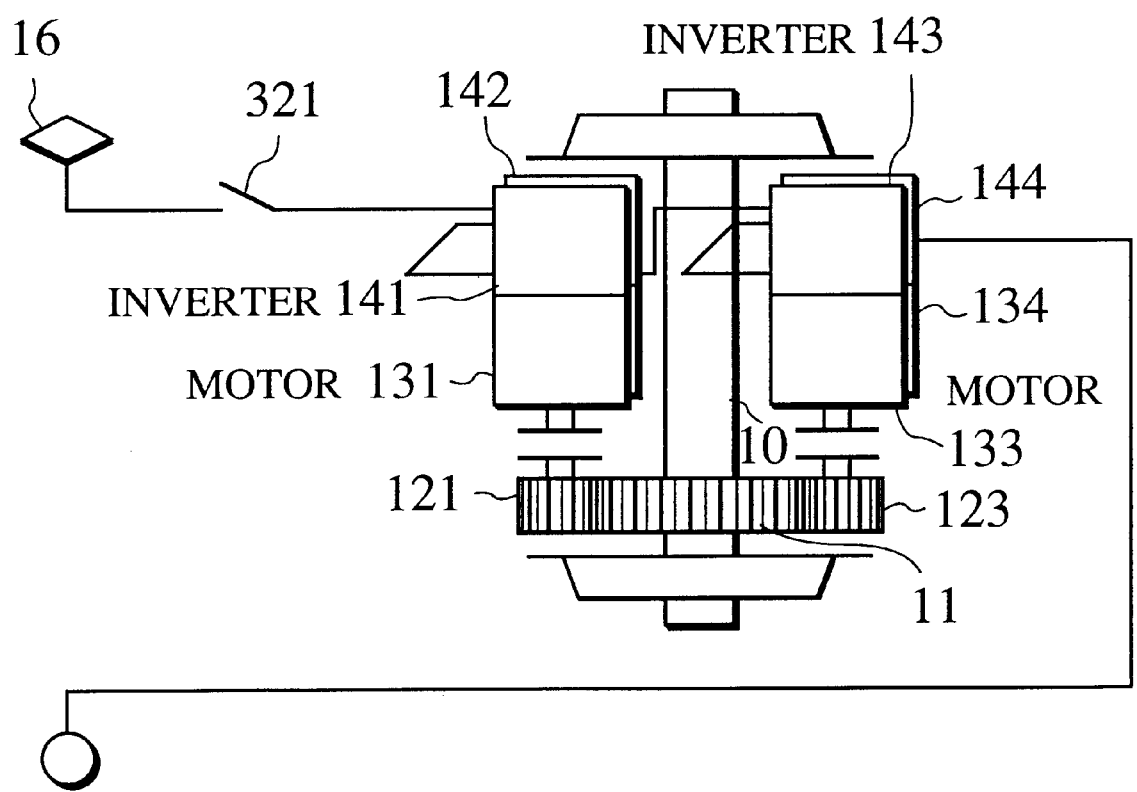
FIG. 22 is a plan view showing a structure according to a 13th embodiment of the present invention.

FIG. 22 shows an apparatus for driving and controlling a car according to the 13th embodiment of the present invention. The 13th embodiment is characterized by a mechanical arrangement. Namely, four inverters 141 to 144 and four AC motors 131 to 134 are integrated, respectively. The integrated units are accommodated in a space in a truck 9 (not shown in FIG. 22, refer to FIG. 3). This space is securable by increasing the rotation speed of the AC motors 131 to 134 according to any one of the first to 12th embodiments of the present invention.

When installing the inverter-motor units on the truck 9, no wiring work is required between the inverters and the motors. Since no underfloor space is needed for the inverters, even a motor car may be constructed into a double-decker structure to accommodate more passenger seats.

What is claimed is:

1. An apparatus for driving and controlling a car, comprising:

a large gear directly connected to a wheel shaft;

small gears meshing with the large gear;

AC motors connected to the small gears, respectively;

standard inverters connected to the AC motors, respectively, for supplying power thereto, DC inputs sides of the inverters being connected in series in multiple stages to a high-voltage DC power source so as to divide a voltage of the DC power source into standard voltage for each of the inverters; and an inverter controller provided for each of the inverters, for receiving a DC source voltage value detected on a power-source transmission line and an input voltage value detected at the inverter, finding a difference between the input voltage value and a quotient obtained by dividing the DC source voltage value by the number of the inverters, and correcting an output torque command for the inverter according to the difference.

2. An apparatus for driving and controlling a car, comprising:

a large gear directly connected to a wheel shaft;

small gears meshing with the large gear;

AC motors connected to the small gears, respectively;

inverters connected to the AC motors, respectively, for supplying power thereto, DC input sides of the inverters being connected in series in multiple stages to a DC power source of high-voltage so as to divide a voltage of the DC power source into a standard voltage for each of the inverters; and an inverter controller provided for each of the inverters, for calculating an output effective power value according to an input DC voltage value and an input DC current value both detected at the inverter, calculating an effective power command value according to a motor angular frequency and a torque command value, calculating a difference between the output effective power value and the effective power command value, and correcting the torque command value according to the difference.

3. An apparatus for driving and controlling a car, comprising:

a single large gear directly connected to a wheel shaft;

a single small gear meshing with the large gear;

a single 3-by-n phase AC motor wherein n is an integer equal to or larger than 2, connected to the small gear;

n inverters for supplying power to the AC motor, DC input sides of the inverters being connected in series in n stages to a high-voltager DC power source; and an inverter controller provided for each of the inverters, for receiving a DC source voltage value detected at the DC power-source and an input voltage value detected at the inverter, finding a difference between the input voltage value and a quotient obtained by dividing the DC source voltage value by n, and correcting an output torque command for the inverter according to the difference.

4. The apparatus of claim 1, further comprising:

a short-circuit switch provided for each of the inverters between positive and negative DC input terminals of the inverter, for short-circuiting the inverter if the inverter fails, so that the remaining inverters may continue to operate.

5. The apparatus of claim 4, further comprising:

a power source disconnection switch for disconnecting the DC power source from the DC input sides of the inverters on condition that at least one of the inverters fails so that the remaining inverters continue to operate and that a DC source voltage from the DC power source exceeds the sum of allowable input DC voltages of the operating inverters.

6. The apparatus of claim 1, further comprising:

an inverter controller for preparing an inverter output voltage command according to a composite value of output currents of the inverters so that the inverters may provide pulse patterns according to the same voltage command.

7. The apparatus of claim 1, wherein frames of the AC motors are electrically short-circuited to a power source ground, and further comprising:

an inverter controller for providing a phase difference for a triangular wave that is used to form a PWM pulse pattern of each inverter.

8. The apparatus of claim 3 further comprising:

a short-circuit switch provided for each of the inverters between positive and negative DC input terminals of the inverter, for short-circuiting the inverter if the inverter fails, so that the remaining inverters may continue to operate.

9. The apparatus of claim 3, wherein the AC motor is a permanent-magnet synchronous motor, further comprising:

an inverter controller for controlling, if at least one of the inverters fails, the remaining inverters to pass a current in a direction to a motor induced voltage so as to prevent the AC motor from producing a short-circuit torque current.

* * * * *